United States Patent
Kikuta

(10) Patent No.: US 12,107,406 B2
(45) Date of Patent: Oct. 1, 2024

(54) POWER SUPPLY BLOCK, WIRING UNIT, AND WIRING SYSTEM

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Takamune Kikuta, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 195 days.

(21) Appl. No.: 17/777,236

(22) PCT Filed: Nov. 11, 2020

(86) PCT No.: PCT/JP2020/042055
§ 371 (c)(1),
(2) Date: May 16, 2022

(87) PCT Pub. No.: WO2021/100573
PCT Pub. Date: May 27, 2021

(65) Prior Publication Data
US 2022/0407299 A1  Dec. 22, 2022

(30) Foreign Application Priority Data
Nov. 21, 2019 (JP) ................. 2019-210702

(51) Int. Cl.
*H01H 85/20* (2006.01)
*B60R 16/02* (2006.01)
*H02G 3/16* (2006.01)

(52) U.S. Cl.
CPC ........... *H02G 3/16* (2013.01); *B60R 16/0207* (2013.01); *H01H 85/2035* (2013.01); *H01H 2085/208* (2013.01)

(58) Field of Classification Search
CPC ........... H01H 85/2015; H01H 85/2035; H01H 85/201; H01H 2085/0555;
(Continued)

(56) References Cited

U.S. PATENT DOCUMENTS 5,038,050 A * 8/1991 Minoura ................ H01R 9/245
361/833
5,057,026 A * 10/1991 Sawai .................... H05K 7/026
439/43
(Continued)

FOREIGN PATENT DOCUMENTS

JP 2003-087937 A 3/2003
JP 2006-333583 A 12/2006
(Continued)

OTHER PUBLICATIONS

International Search Report issued on Jan. 12, 2021 for WO 2021/100573 A1 (4 pages).

*Primary Examiner* — Steven T Sawyer
(74) *Attorney, Agent, or Firm* — Venjuris, P.C.

(57) ABSTRACT

The present disclosure has an object of providing a power supply block suitable to be shared among different types or classes of vehicles. A power supply block includes a block main body including a first insertion port for inserting a power supply terminal and a first fuse terminal insertion port for inserting a connection terminal, a conductive first conduction member that is held inside the block main body and (Continued)

configured to be electrically connected to the power supply terminal, and a conductive second conduction member that is held inside the block main body, is electrically connected to the first conduction member inside the block main body, and is configured to be electrically connected to the connection terminal.

9 Claims, 10 Drawing Sheets

(58) Field of Classification Search
CPC ..... H01H 2085/2075; H01H 2085/208; H01H 85/20; H02G 3/16; B60R 16/0207; B60R 16/03
See application file for complete search history.

(56) References Cited

U.S. PATENT DOCUMENTS

| | | | | |
|---|---|---|---|---|
| 5,328,392 | A * | 7/1994 | Lin | H01R 13/113 439/833 |
| 5,670,928 | A * | 9/1997 | Cheng | H01H 85/202 361/833 |
| 6,004,159 | A * | 12/1999 | Liang | H01R 11/22 439/620.27 |
| 2018/0294127 | A1* | 10/2018 | Ku | H01H 85/2035 |
| 2018/0294129 | A1* | 10/2018 | Ku | H01H 85/2035 |

FOREIGN PATENT DOCUMENTS

| | | |
|---|---|---|
| JP | 2014-220864 A | 11/2014 |
| JP | 2018-093685 A | 6/2018 |

* cited by examiner

(12) United States Patent...

POWER SUPPLY BLOCK, WIRING UNIT, AND WIRING SYSTEM

CROSS REFERENCE TO RELATED APPLICATIONS

This application is a national phase of PCT application No. PCT/JP2020/042055, filed on 11 Nov. 2020, which claims priority from Japanese patent application No. 2019-210702, filed on 21 Nov. 2019, all of which are incorporated herein by reference.

TECHNICAL FIELD

The present disclosure relates to a power supply block, a wiring unit, and a wiring system.

BACKGROUND

Many electrical devices are installed in vehicles such as automobiles. In some cases, power of a battery installed in a vehicle is distributed to the electrical devices via a power supply box such as a fuse box or a junction box. For example, a power supply box as described in Patent Document 1 includes a power supply terminal to which power is supplied from a battery and a plurality of terminals to which connection terminals of devices to which power is to be distributed are connected.

PRIOR ART DOCUMENT

Patent Document

Patent Document 1: JP 2006-333583 A

SUMMARY OF THE INVENTION

Problems to be Solved

In recent years, there are demands for sharing power supply boxes among different types or classes of vehicles. The number of connection terminals that can be connected to the power supply box described in Patent Document 1 cannot be increased or reduced unless the design of the power supply box is changed to change the number of terminals. Accordingly, in order to share the power supply box described in Patent Document 1 among different types or classes of vehicles, it is conceivable to set the number of terminals assuming a case where the number of connection terminals connected to the power supply box is the largest. However, in this case, terminals that will not be used may be included in the power supply box depending on the type or class of the vehicle. Furthermore, due to including terminals that will not be used, the power supply box may be larger than a power supply box that only includes the required number of terminals. Therefore, the power supply box described in Patent Document 1 is not suitable to be shared among different types or classes of vehicles.

An object of the present disclosure is to provide a power supply block, a wiring unit, and a wiring system that are suitable to be shared among different types or classes of vehicles.

Means to Solve the Problem

A power supply block according to the present disclosure includes a block main body that includes a first insertion port for inserting a power supply terminal and a second insertion port for inserting a connection terminal, a conductive first conduction member that is held inside the block main body and is configured to be electrically connected to the power supply terminal, and a conductive second conduction member that is held inside the block main body, is electrically connected to the first conduction member inside the block main body, and is configured to be electrically connected to the connection terminal.

Effect of the Invention

The power supply block, the wiring unit, and the wiring system according to the present disclosure can be shared among different types or classes of vehicles.

DETAILED DESCRIPTION TO EXECUTE THE INVENTION

Figure 1:
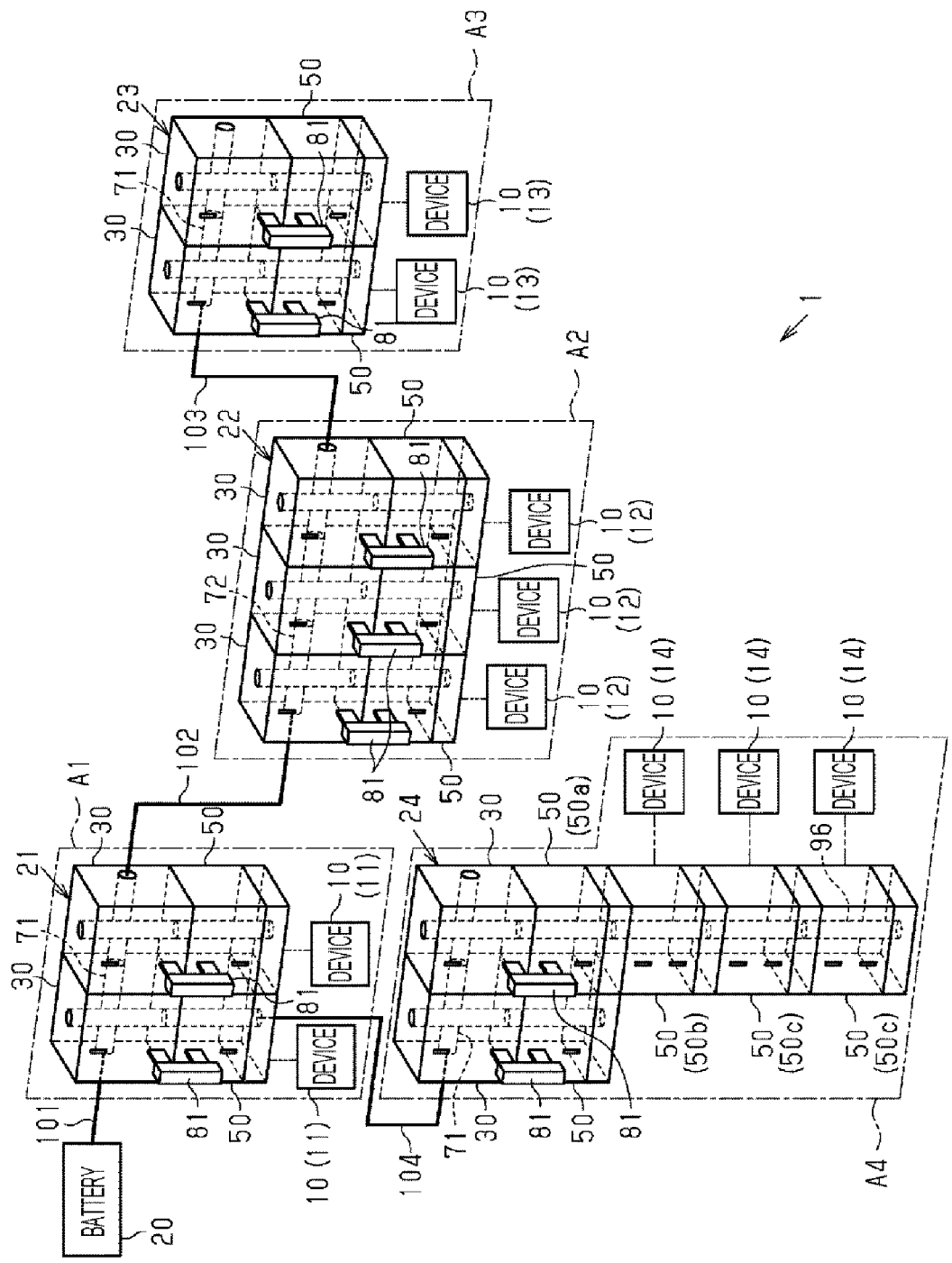
FIG. 1 is a schematic diagram showing a wiring system according to an embodiment.

Description of Embodiments of the Present Disclosure

First, aspects of implementation of the present disclosure will be listed and described.

(1) A power supply block according to the present disclosure is a power supply block including: a block main body that includes a first insertion port for inserting a power supply terminal and a second insertion port for inserting a connection terminal; a conductive first conduction member that is held inside the block main body and is configured to be electrically connected to the power supply terminal; and a conductive second conduction member that is held inside the block main body, is electrically connected to the first conduction member inside the block main body, and is configured to be electrically connected to the connection terminal.

According to this aspect, power can be supplied from the power supply terminal. Power supplied to the power supply terminal can be distributed via the first conduction member, the second conduction member, and the connection terminal. The number of connection terminals that can be connected can be easily changed by changing the number of power supply blocks to be used. Accordingly, a power supply block suitable to be shared among different types or classes of vehicles can be obtained.

(2) Preferably, the connection terminal is a first fuse terminal of a fuse that includes the first fuse terminal and a second fuse terminal, and the second insertion port is a first fuse terminal insertion port for inserting the first fuse terminal.

According to this aspect, power supplied to the power supply terminal can be distributed via the fuse.

(3) Preferably, the block main body includes a connection hole that extends through the block main body, the first insertion port is an opening on one side of the connection hole, and the first conduction member is exposed to the inside of the connection hole.

According to this aspect, the first conduction member is exposed to the inside of the connection hole, and therefore, the power supply terminal can be electrically connected to the first conduction member by being inserted into the connection hole from the first insertion port. When the power supply terminal is passed through the connection holes of a plurality of power supply blocks, the power supply terminal can be electrically connected to the first conduction members included in the power supply blocks. Therefore, power supplied to the single power supply terminal can be distributed to each of the plurality of power supply blocks.

(4) A wiring unit according to the present disclosure is a wiring unit including the power supply block and a first coupling block that includes a first coupling block main body and a conductive third conduction member that is held inside the first coupling block main body, wherein the first coupling block main body includes a second fuse terminal insertion port for inserting the second fuse terminal of the fuse that includes the first fuse terminal inserted into the first fuse terminal insertion port, and the second fuse terminal inserted into the second fuse terminal insertion port is electrically connected to the third conduction member.

According to this aspect, the fuse can be easily connected between the second conduction member and the third conduction member.

(5) Preferably, the first coupling block main body includes a first output terminal insertion port for inserting an output terminal, and the output terminal inserted into the first output terminal insertion port is electrically connected to the third conduction member.

According to this aspect, power supplied to the power supply terminal can be distributed via the output terminal to an electrical device or the like that is electrically connected to the output terminal.

(6) Preferably, the wiring unit includes a plurality of the power supply blocks, wherein first fuse terminals of different fuses are respectively inserted into the first fuse terminal insertion ports of at least two power supply blocks of the plurality of power supply blocks, the wiring unit includes at least the same number of first coupling blocks as the fuses, and a plurality of the second fuse terminals are respectively inserted into the second fuse terminal insertion ports of different first coupling blocks.

According to this aspect, the number of fuses included in the wiring unit can be easily changed by combining the power supply blocks and the first coupling blocks. Therefore, the required number of fuses can be provided in the wiring unit according to the type or class of the vehicle.

(7) Preferably, the wiring unit further includes a second coupling block that includes a second coupling block main body and a conductive fourth conduction member that is held inside the second coupling block main body, wherein the first coupling block main body includes a first coupling port for inserting a coupling terminal, the second coupling block main body includes a second coupling port for inserting the coupling terminal inserted into the first coupling port and a second output terminal insertion port for inserting an output terminal other than the output terminal inserted into the first output terminal insertion port, the third conduction member is electrically connected to the coupling terminal inserted into the first coupling port, and the fourth conduction member is electrically connected to the coupling terminal inserted into the second coupling port and the output terminal inserted into the second output terminal insertion port.

According to this aspect, power supplied to the power supply terminal can be distributed via the output terminal inserted into the first output terminal insertion port and the output terminal inserted into the second output terminal insertion port to electrical devices or the like that are electrically connected to the output terminals. Moreover, the output terminal inserted into the first output terminal insertion port is connected to the fuse via the third conduction member. Furthermore, the output terminal inserted into the second output terminal insertion port is connected to the same fuse via the fourth conduction member, the coupling terminal, and the third conduction member. Therefore, the configuration in which the output terminals are electrically connected to the same fuse can be realized without a configuration for making a splice connection of wires.

(8) Preferably, the wiring unit further includes at least one third coupling block that includes a third coupling block main body and a conductive fifth conduction member that is held inside the third coupling block main body, wherein the first coupling block main body includes a first coupling hole that extends through the first coupling block main body, the first coupling port is an opening on one side of the first coupling hole, the third conduction member is exposed to the inside of the first coupling hole, the second coupling block main body includes a second coupling hole that extends through the second coupling block main body, the second coupling port is an opening on one side of the second coupling hole, the fourth conduction member is exposed to the inside of the second coupling hole, the third coupling block main body includes a third coupling hole that extends through the third coupling block main body and a third output terminal insertion port for connecting an output terminal other than the output terminal inserted into the first output terminal insertion port and the output terminal inserted into the second output terminal insertion port, the fifth conduction member is exposed to the inside of the third coupling hole and configured to be electrically connected to the output terminal inserted into the third output terminal insertion port, and the coupling terminal passes through the first coupling hole, the second coupling hole, and the third coupling hole, and is electrically connected to the third conduction member inside the first coupling hole, the fourth conduction member inside the second coupling hole, and the fifth conduction member inside the third coupling hole.

According to this aspect, the coupling terminal is electrically connected to the third conduction member, the fourth conduction member, and the fifth conduction member by passing through the first coupling hole, the second coupling hole, and the third coupling hole. Accordingly, the coupling terminal can be easily electrically connected to the third conduction member, the fourth conduction member, and the fifth conduction member. Furthermore, power distributed to the coupling terminal via the power supply terminal, the first conduction member, the second conduction member, the fuse, and the third conduction member can be distributed via the fourth conduction member and the fifth conduction member to a plurality of electrical devices or the like.

(9) Preferably, the first coupling block main body includes a power distribution layer that is made of an insulative material and holds the third conduction member and a ground layer that is made of a conductive material and is grounded, and the ground layer includes an earth terminal insertion port for inserting an earth terminal, and the earth terminal inserted into the earth terminal insertion port is electrically connected to the ground layer.

According to this aspect, the earth terminal can be grounded via the ground layer in the first coupling block.

(10) Preferably, the ground layer includes a locking member insertion port for inserting a locking member that passes through the earth terminal inside the ground layer.

According to this aspect, the earth terminal can be kept from coming out of the ground layer by the locking member inserted into the locking member insertion port.

(11) A wiring system according to the present disclosure is a wiring system wherein the wiring unit is arranged in each of a plurality of installation areas in which at least one electrical device is installed, and the wiring units distribute power supplied from their power supply terminal, via their connection terminal to the electrical devices installed in the installation areas in which the wiring units are arranged.

According to this aspect, the power supply block and the first coupling block can be shared among wiring units arranged in different installation areas. This eliminates the need to design components for the respective wiring units arranged in the different installation areas, and wiring units suitable for the respective installation areas can be formed by combining the power supply blocks, the first coupling blocks, and the like. The number of fuses can be made appropriate for each of the installation areas by combining the power supply blocks, the first coupling blocks, and the like.

Accordingly, an appropriate number of fuses can be provided in each of the wiring units arranged in the installation areas according to electrical devices installed in the corresponding installation area.

(12) Preferably, the wiring system includes a wire that electrically connects the power supply terminals included in different wiring units.

According to this aspect, power can be supplied from the power supply terminal of a wiring unit via the wire to the power supply terminal of another wiring unit. Therefore, power can be distributed from a common battery to the plurality of wiring units.

Details of Embodiments of the Present Disclosure

The following describes specific examples of a power supply block, a wiring unit, and a wiring system of the present disclosure with reference to the drawings. The present invention is not limited to these examples but is indicated by the claims, and all modifications that fall within the meaning and range of equivalency with the claims are intended to be encompassed therein. Some constitutional elements may be enlarged in the attached drawings to facilitate understanding. Ratios of dimensions of constitutional elements shown in the attached drawings may differ from actual ratios or ratios shown in other drawings.

The following describes an embodiment of the power supply block, the wiring unit, and the wiring system.

FIG. 1 schematically shows a wiring system 1 installed in a vehicle such as an automobile. A plurality of installation areas in which electrical devices 10 are arranged are set in the vehicle. The number of installation areas can be set as appropriate according to the type and class of the vehicle. For example, two to ten and several areas are set. In the present embodiment, four areas, namely a first installation area A1, a second installation area A2, a third installation area A3, and a fourth installation area A4, are set in the vehicle. Locations of the installation areas can also be set as appropriate according to the type and class of the vehicle. The first and second installation areas A1 and A2 are set near an engine room in a front portion of the vehicle, for example. On the other hand, the third and fourth installation areas A3 and A4 are set on the rear side of the vehicle with respect to the first and second installation areas A1 and A2, for example.

The wiring system 1 distributes power of a battery 20 installed in the vehicle to the electrical devices 10. That is, the wiring system 1 electrically connects the battery 20 and each electrical device 10. The wiring system 1 includes first to fourth wiring units 21 to 24 that are respectively arranged in the installation areas A1 to A4 of electrical devices 10 to which power of the battery 20 is distributed. The first wiring unit 21 is arranged in the first installation area A1. The second wiring unit 22 is arranged in the second installation area A2. The third wiring unit 23 is arranged in the third installation area A3. The fourth wiring unit 24 is arranged in the fourth installation area A4.

Each of the wiring units 21 to 24 is formed by combining two types of wiring blocks: power supply blocks 30 and coupling blocks 50.

[Configuration of Power Supply Block]

First, the configuration of the power supply block 30 will be described.

Figure 2:
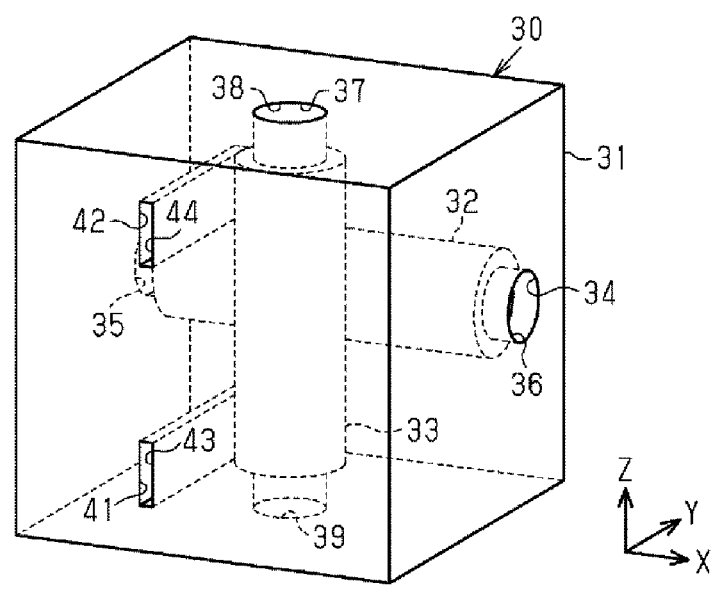
FIG. 2 is a perspective view schematically showing a power supply block according to an embodiment.
Figure 3:
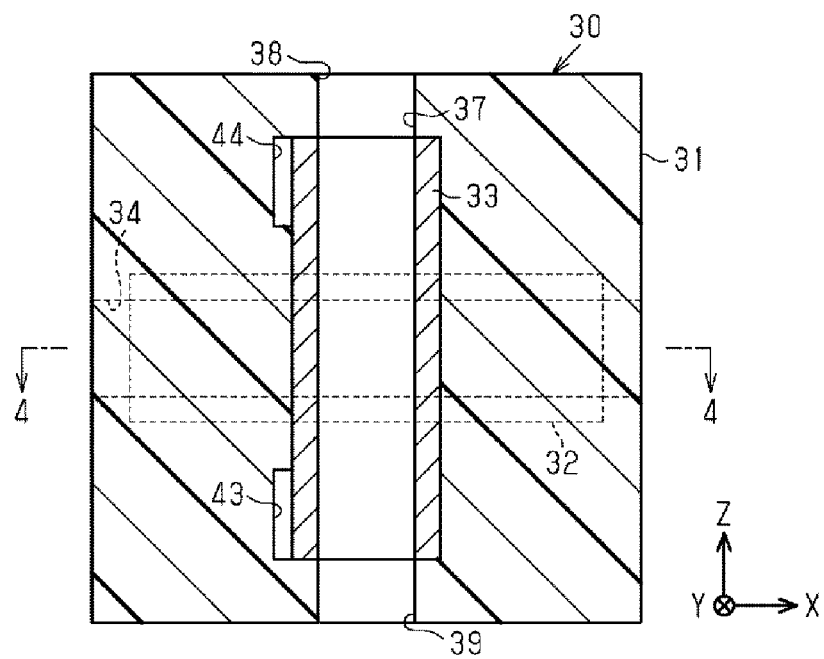
FIG. 3 is a cross-sectional view schematically showing the power supply block according to an embodiment.
Figure 4:
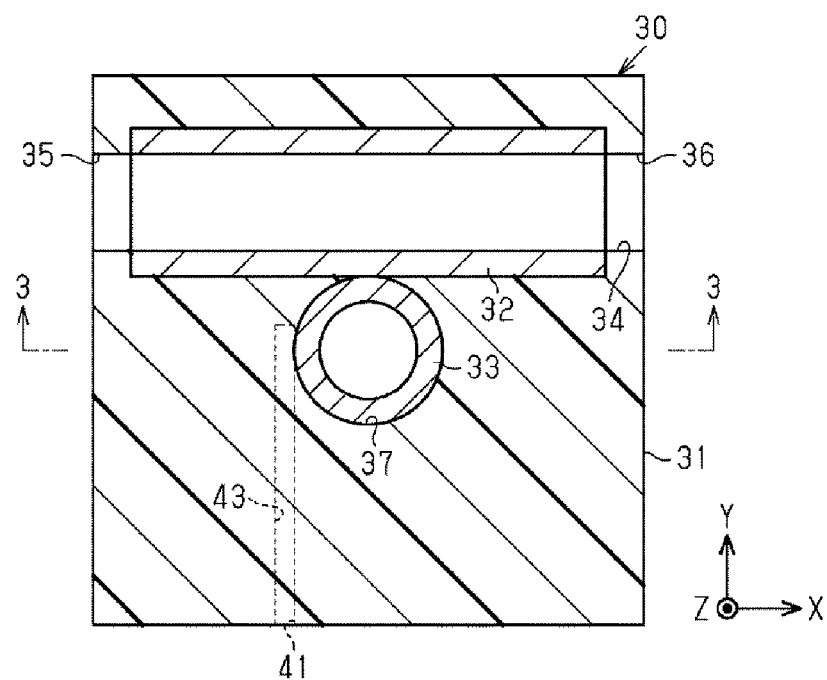
FIG. 4 is a cross-sectional view schematically showing the power supply block according to an embodiment.

As shown in FIGS. 2 to 4, the power supply block 30 includes a block main body 31, a conductive first conduction member 32 that is held inside the block main body 31, and a conductive second conduction member 33 that is held inside the block main body 31.

The block main body 31 is made of an insulative resin material. The block main body 31 in the present embodiment has a cubic shape. The block main body 31 includes a first through hole 34 that extends through the block main body 31. In the present embodiment, the first through hole 34 corresponds to a "connection hole". The first through hole 34 extends through the block main body 31 in a direction perpendicular to a pair of mutually parallel outer surfaces of the block main body 31. A cross section of the first through hole 34 orthogonal to the direction in which the first through hole 34 extends has a circular shape. The opening on one side of the first through hole 34 is a first insertion port 35. In FIGS. 2 to 4, the left opening of the first through hole 34 is the first insertion port 35. The opening on the other side of the first through hole 34 is a first connection port 36. In FIGS. 2 to 4, the right opening of the first through hole 34 is the first connection port 36.

The first conduction member 32 is held on the inner circumferential surface of the first through hole 34. The first conduction member 32 is made of a conductive material. For example, the first conduction member 32 is made of a metal material that has good conductivity, such as copper, a copper alloy, aluminum, or an aluminum alloy. The first conduction member 32 has a hollow cylindrical shape. The length of the first conduction member 32 in the axial direction is shorter than the length of the first through hole 34 in the direction in which it extends. The first conduction member 32 is arranged so as to extend in a direction that matches the direction in which the first through hole 34 extends. Furthermore, the first conduction member 32 is arranged in a center portion in the direction in which the first through hole 34 extends. Accordingly, both end portions of the first conduction member 32 in its axial direction do not protrude to the outside of the block main body 31. Also, the portions of the first through hole 34 located on both sides in the axial direction of the first conduction member 32 are formed so as to have the same inner diameter as the first conduction member 32. The inner circumferential surface of the first conduction member 32 is exposed to the inside of the first through hole 34.

The block main body 31 includes a second through hole 37 that extends through the block main body 31. The second through hole 37 extends through the block main body 31 in a direction perpendicular to a pair of mutually parallel outer surfaces of the block main body 31 other than the surface in which the first insertion port 35 is open and the surface in which the first connection port 36 is open. The direction in which the second through hole 37 extends is orthogonal to the direction in which the first through hole 34 extends when viewed from a direction perpendicular to the direction in which the first through hole 34 extends and the direction in which the second through hole 37 extends.

Although the power supply block 30 can have any orientation, in the description of the present embodiment, the direction in which the first through hole 34 extends will be referred to as "left-right direction", the direction in which the second through hole 37 extends will be referred to as "up-down direction", and the direction orthogonal to the direction in which the first through hole 34 extends and the direction in which the second through hole 37 extends will be referred to as "front-rear direction". In the drawings, the direction from left toward right is shown as an X direction, the direction from the front side toward the rear side is shown as a Y direction, and the direction from the lower side toward the upper side is shown as a Z direction.

In the present embodiment, the second through hole 37 is formed in a center portion of the block main body 31 when viewed in the up-down direction. A cross section of the second through hole 37 orthogonal to the direction in which the second through hole 37 extends has a circular shape. The opening on one side of the second through hole 37 is a second connection port 38. In FIGS. 2 and 3, the upper opening of the second through hole 37 is the second connection port 38. The opening on the other side of the second through hole 37 is a third connection port 39. In FIGS. 2 and 3, the lower opening of the second through hole 37 is the third connection port 39.

The second through hole 37 is located to the front of the first through hole 34. When viewed in the up-down direction, the first through hole 34 and the second through hole 37 are in contact with each other. Specifically, a center portion of the first through hole 34 in the direction in which it extends is in contact with a center portion of the second through hole 37 in the direction in which it extends. Accordingly, in the center portion of the first through hole 34 in the direction in which it extends, the outer circumferential surface of the first conduction member 32 is exposed to the inside of the second through hole 37.

The second conduction member 33 is held on the inner circumferential surface of the second through hole 37. The second conduction member 33 is made of a conductive material. For example, the second conduction member 33 is made of a metal material that has good conductivity, such as copper, a copper alloy, aluminum, or an aluminum alloy. The second conduction member 33 has a hollow cylindrical shape. The length of the second conduction member 33 in the axial direction is shorter than the length of the second through hole 37 in the direction in which it extends. The second conduction member 33 is arranged so as to extend in a direction that matches the direction in which the second through hole 37 extends. Furthermore, the second conduction member 33 is arranged in a center portion in the direction in which the second through hole 37 extends. Accordingly, both end portions in the axial direction of the second conduction member 33 do not protrude to the outside of the block main body 31. Also, portions of the second through hole 37 located on both sides in the axial direction of the second conduction member 33 are formed so as to have the same inner diameter as the second conduction member 33.

Since the center portion of the first through hole 34 in the direction in which it extends and the center portion of the second through hole 37 in the direction in which it extends are in contact with each other, the outer circumferential surface of the second conduction member 33 is exposed to the inside of the first through hole 34 in the center portion of the second through hole 37 in the direction in which it extends. The outer circumferential surface of the first conduction member 32 exposed to the inside of the second through hole 37 is in contact with the outer circumferential surface of the second conduction member 33 exposed to the inside of the first through hole 34. Thus, the first conduction member 32 and the second conduction member 33 are electrically connected to each other.

The block main body 31 includes two first fuse terminal insertion ports 41 and 42. Two first insertion holes 43 and 44 that are recessed from the front surface of the block main body 31 toward the rear side are formed in the block main body 31. When the power supply block 30 is viewed in the front-rear direction, the first insertion holes 43 and 44 are in contact with the outer circumferential surface of the second conduction member 33. The two first insertion holes 43 and 44 are spaced apart from each other in the up-down direction. The second conduction member 33 is exposed to the inside of the first insertion holes 43 and 44. The opening of the lower first insertion hole 43 is the first fuse terminal insertion port 41. The opening of the upper first insertion hole 44 is the first fuse terminal insertion port 42. In the present embodiment, the first fuse terminal insertion port 41 corresponds to a "second insertion port".

The power supply block 30 can be formed through insertion molding, for example. However, the method for manufacturing the power supply block 30 is not limited to insertion molding.

[Configuration of Coupling Block]

Next, the configuration of the coupling block 50 will be described.

Figure 5:
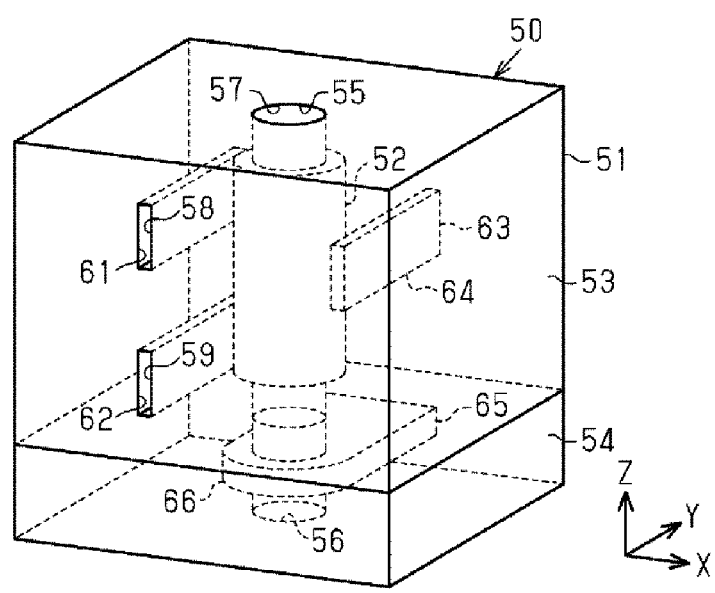
FIG. 5 is a perspective view schematically showing a coupling block according to an embodiment.

As shown in FIG. 5, the coupling block 50 includes a coupling block main body 51 and a conductive third conduction member 52 that is held inside the coupling block main body 51. Although the coupling block 50 can have any orientation, the left-right direction, the up-down direction, and the front-rear direction of the power supply block 30 when the coupling block 50 in the present embodiment is assembled to the power supply block 30 directly or indirectly will be referred to as the left-right direction, the up-down direction, and the front-rear direction of the coupling block 50, respectively.

The coupling block main body 51 in the present embodiment has a cubic shape and the same size as the block main body 31 of the power supply block 30. The coupling block main body 51 includes a power distribution layer 53 that is made of an insulative material and holds the third conduction member 52 and a ground layer 54 that is made of a conductive material and is grounded. In the present embodiment, the ground layer 54 is provided on the lower end surface of the power distribution layer 53 and forms a single body with the power distribution layer 53. The power distribution layer 53 is made of the same insulative resin material as the block main body 31, for example. The ground layer 54 is made of a conductive resin material, for example. The power distribution layer 53 and the ground layer 54 each have a rectangular parallelepiped shape. The power distribution layer 53 and the ground layer 54 together form a rectangular parallelepiped shape as a whole.

Figure 6:
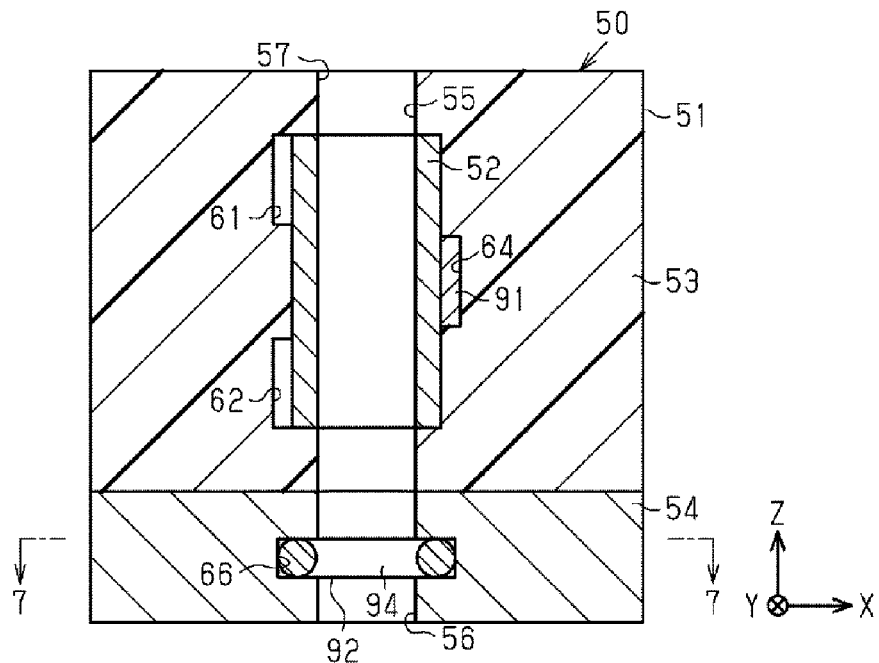
FIG. 6 is a cross-sectional view schematically showing the coupling block according to an embodiment.
Figure 7:
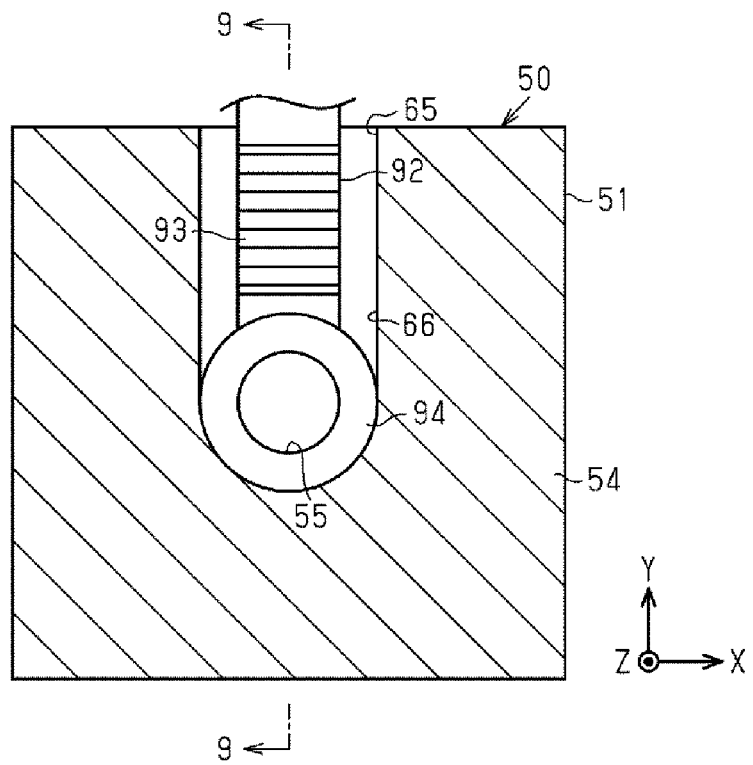
FIG. 7 is a cross-sectional view schematically showing the coupling block according to an embodiment.

As shown in FIGS. 5 to 7, the coupling block main body 51 includes a third through hole 55 that extends through the coupling block main body 51. The third through hole 55 extends through the power distribution layer 53 and the ground layer 54 of the coupling block main body 51 in the up-down direction. In the present embodiment, the third through hole 55 is formed in a center portion of the coupling block main body 51 when viewed in the up-down direction. A cross section of the third through hole 55 orthogonal to the direction in which the third through hole 55 extends has a circular shape. The opening on one side of the third through hole 55 is a first coupling port 56. In FIGS. 5 and 6, the lower opening of the third through hole 55 is the first coupling port 56. The opening on the other side of the third through hole 55 is a second coupling port 57. In FIGS. 5 and 6, the upper opening of the third through hole 55 is the second coupling port 57.

The third conduction member 52 is held on the inner circumferential surface of the third through hole 55. The third conduction member 52 is made of a conductive material. For example, the third conduction member 52 is made of a metal material that has good conductivity, such as copper, a copper alloy, aluminum, or an aluminum alloy. The third conduction member 52 has a hollow cylindrical shape. The length of the third conduction member 52 in the axial direction is shorter than the length of the power distribution layer 53 in the direction in which the third through hole 55 extends, i.e., shorter than the length of the power distribution layer 53 in the up-down direction. The third conduction member 52 is arranged so as to extend in a direction that matches the direction in which the third through hole 55 extends. Furthermore, the third conduction member 52 is arranged in a center portion in the up-down direction of the power distribution layer 53 relative to the third through hole 55. Accordingly, both end portions in the axial direction of the third conduction member 52 do not protrude to the outside of the coupling block main body 51. Also, portions of the third through hole 55 located on both sides in the axial direction of the third conduction member 52 are formed so as to have the same inner diameter as the third conduction member 52.

An insulative film (not shown) is provided on the inner circumferential surface of the portion of the third through hole 55 that is included in the ground layer 54. The insulative film is formed through application, coating, or plating, for example. Alternatively, the insulative film may also be formed through two-color molding on the inner circumferential surface of the portion of the third through hole 55 in the ground layer 54.

As shown in FIGS. 5 and 6, the coupling block main body 51 includes a second fuse terminal insertion port 58 and a third fuse terminal insertion port 59. Two second insertion holes 61 and 62 that are recessed from the front surface of the coupling block main body 51 toward the rear side are formed in the coupling block main body 51. The second insertion holes 61 and 62 are provided in the power distribution layer 53. When the coupling block 50 is viewed in the front-rear direction, the second insertion holes 61 and 62 are in contact with the outer circumferential surface of the third conduction member 52. The two second insertion holes 61 and 62 are spaced apart from each other in the up-down direction. The third conduction member 52 is exposed to the inside of the second insertion holes 61 and 62. The opening of the upper second insertion hole 61 is the second fuse terminal insertion port 58. The opening of the lower second insertion hole 62 is the third fuse terminal insertion port 59.

As shown in FIGS. 5, 6, 8, and 9, the coupling block main body 51 includes an output terminal insertion port 63. A third insertion hole 64 that is recessed from the rear surface of the coupling block main body 51 toward the front side is formed in the coupling block main body 51. The third insertion hole 64 is provided in the power distribution layer 53. When the coupling block 50 is viewed in the front-rear direction, the third insertion hole 64 is located between the two second insertion holes 61 and 62 in the up-down direction. The third conduction member 52 is exposed to the inside of the third insertion hole 64. The opening of the third insertion hole 64 is the output terminal insertion port 63.

Figure 8:
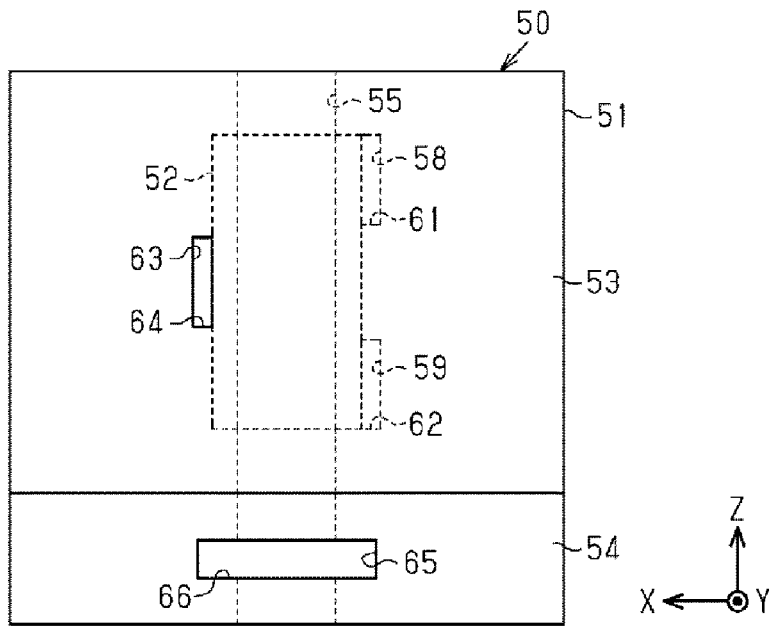
FIG. 8 is a rear view schematically showing the coupling block according to an embodiment.
Figure 9:
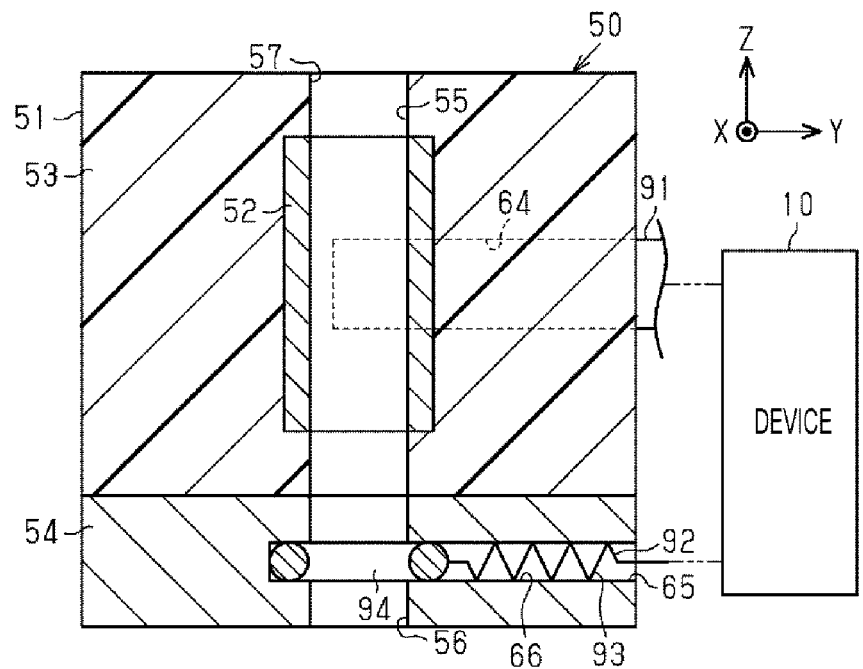
FIG. 9 is a cross-sectional view schematically showing the coupling block according to an embodiment.

As shown in FIGS. 7, 8, and 9, the ground layer 54 includes an earth terminal insertion port 65. A fourth insertion hole 66 that is recessed from the rear surface of the ground layer 54 toward the front side is formed in the ground layer 54. The fourth insertion hole 66 is recessed to the front side of the third through hole 55. Accordingly, the third through hole 55 and the fourth insertion hole 66 intersect each other when viewed in the left-right direction. The third through hole 55 extends through the coupling block main body 51 via the fourth insertion hole 66. The width of the fourth insertion hole 66 in a direction that is orthogonal to the direction in which the third through hole 55 extends and the direction in which the fourth insertion hole 66 is recessed, i.e., the width of the fourth insertion hole 66 in the left-right direction is wider than the inner diameter of the third through hole 55. An end surface of the fourth insertion hole 66 in the direction in which it is recessed is curved in a semicircular shape. Accordingly, when the fourth insertion hole 66 is viewed in the up-down direction, the inner circumferential surface of the fourth insertion hole 66 has a U-shape. The opening of the fourth insertion hole 66 is the earth terminal insertion port 65.

The coupling block 50 is formed by, for example, forming the power distribution layer 53 holding the third conduction member 52 through insertion molding and then forming the ground layer 54 to form a single body with the power distribution layer 53 through two-color molding. However, the method for manufacturing the coupling block 50 is not limited to this method.

[Configurations of Wiring Units]

Next, configurations of the first to fourth wiring units 21 to 24 will be described.

Figure 10:
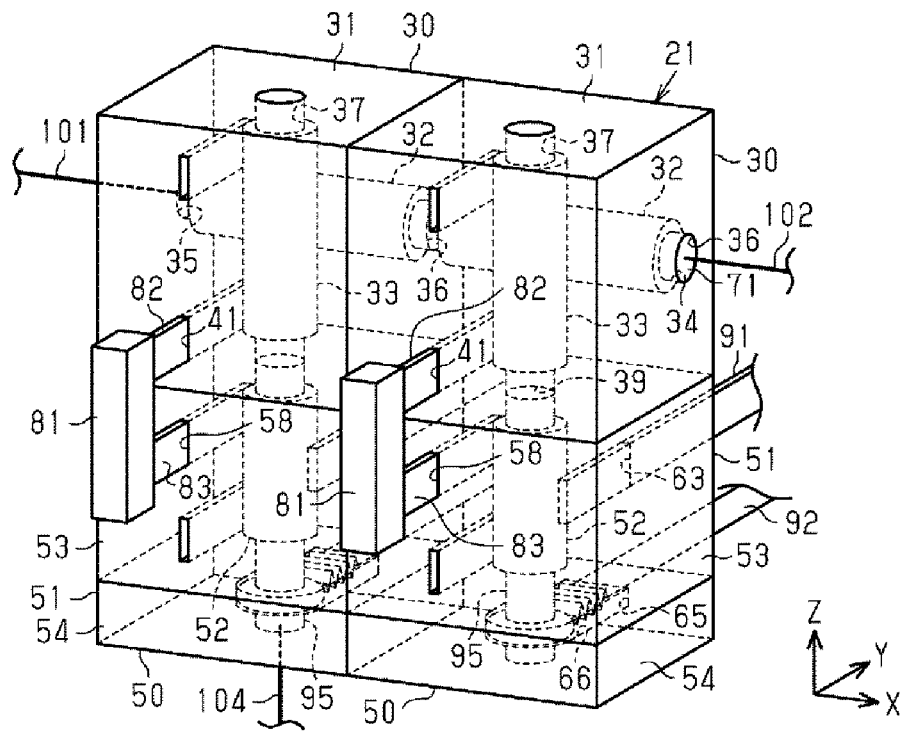
FIG. 10 is a perspective view schematically showing a first wiring unit according to an embodiment.

As shown in FIG. 10, the first wiring unit 21 includes two power supply blocks 30 and two coupling blocks 50. The two power supply blocks 30 are arranged adjacent to each other in the left-right direction. A coupling block 50 is arranged below each power supply block 30. The two coupling blocks 50 are arranged adjacent to each other in the left-right direction. In the first wiring unit 21 of the present embodiment, each of the coupling blocks 50 respectively arranged below the power supply blocks 30 corresponds to a "first coupling block". In the first wiring unit 21 of the present embodiment, the coupling block main body 51 of each coupling block 50 corresponds to a "first coupling block main body". Furthermore, in the first wiring unit 21 of the present embodiment, the output terminal insertion port 63 of each coupling block 50 corresponds to a "first output terminal insertion port".

Figure 11:
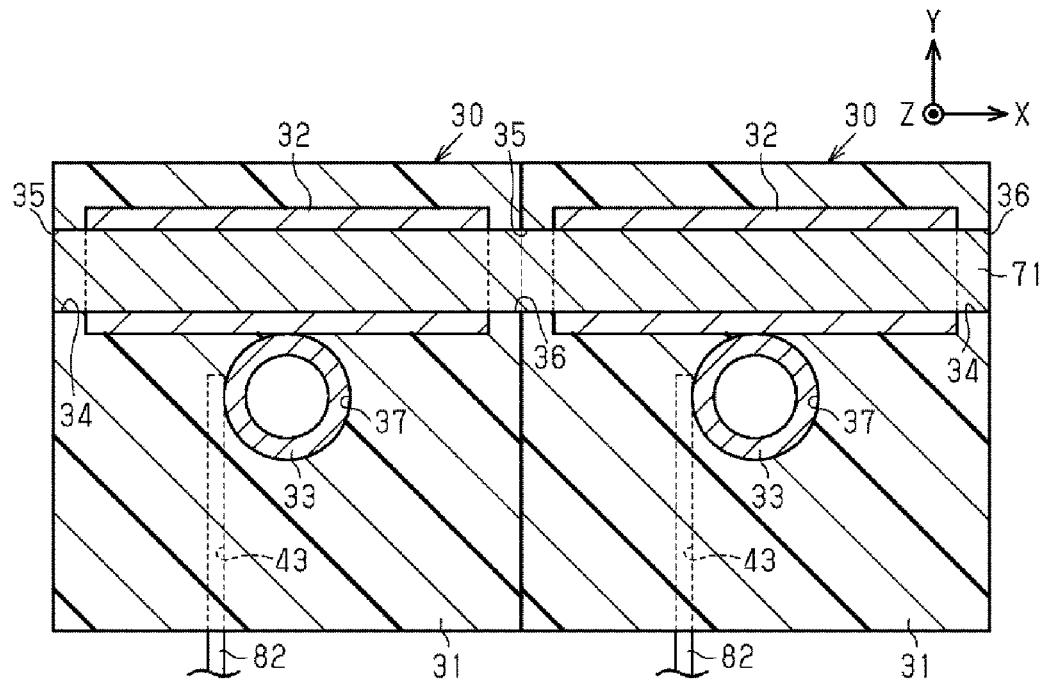
FIG. 11 is a cross-sectional view schematically showing coupled power supply blocks according to an embodiment.

FIG. 11 is a cross-sectional view of the two adjacent power supply blocks 30. The two power supply blocks 30 are arranged such that the first through hole 34 of one power supply block 30 and the first through hole 34 of the other power supply block 30 are arranged coaxially, i.e., the two first conduction members 32 of the two power supply blocks 30 are arranged coaxially. In FIG. 11, the first insertion port 35 of the right power supply block 30 is opposed to the first connection port 36 of the left power supply block 30. Also, the right end surface of the block main body 31 of the left power supply block 30 abuts against the left end surface of the block main body 31 of the right power supply block 30.

A first power supply terminal 71 is inserted from the first insertion port 35 of the left power supply block 30 into the two power supply blocks 30 arranged side by side. The first power supply terminal 71 is made of a conductive material. For example, the first power supply terminal 71 is made of a metal material that has good conductivity, such as copper, a copper alloy, aluminum, or an aluminum alloy. The first power supply terminal 71 is rod-shaped. In the present embodiment, the first power supply terminal 71 has a circular column shape. The outer diameter of the first power supply terminal 71 is such that the outer circumferential surface of the first power supply terminal 71 comes into contact with the inner circumferential surface of the first conduction members 32 and is electrically connected thereto when the first power supply terminal 71 is inserted into the first conduction members 32. Also, the outer diameter of the first power supply terminal 71 is such that the first power supply terminal 71 can pass through the inside of the first conduction members 32.

The first power supply terminal 71 is inserted from the first insertion port 35 of the left power supply block 30 into the first through hole 34 of the left power supply block 30, and after passing through the first conduction member 32 of the same power supply block 30, protrudes from the first connection port 36 of the power supply block 30 to the outside of the power supply block 30. Then, the first power supply terminal 71 protruding from the first connection port 36 of the left power supply block 30 is inserted from the first insertion port 35 of the right power supply block 30 into the first through hole 34 of the right power supply block 30, and after passing through the first conduction member 32 of the same power supply block 30, is exposed to the outside of the same power supply block 30 from the first connection port 36 of the power supply block 30.

The outer circumferential surface of the first power supply terminal 71 comes into contact with the inner circumferential surfaces of the two first conduction members 32, and thus the first power supply terminal 71 is electrically connected to the first conduction members 32. In the two power supply blocks 30, power supplied via the first power supply terminal 71 is distributed to the first conduction members 32 of the power supply blocks 30.

Figure 12:
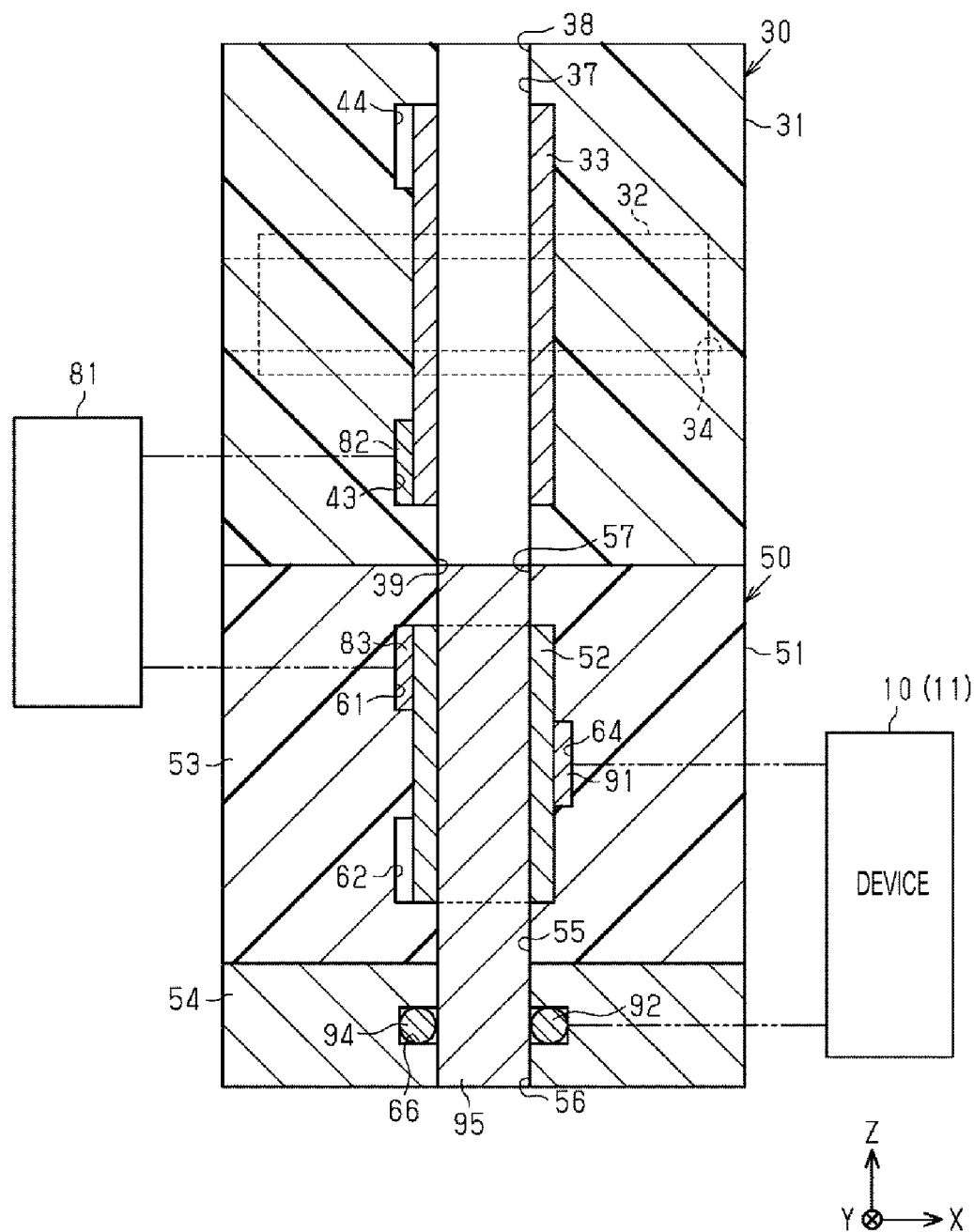
FIG. 12 is a cross-sectional view schematically showing a power supply block and a coupling block coupled to each other according to an embodiment.

FIG. 12 is a cross-sectional view of a power supply block 30 and a coupling block 50 arranged adjacent to each other. In FIG. 10, the power supply block 30 and the coupling block 50 arranged in the up-down direction on the left side are coupled in the same manner as the power supply block 30 and the coupling block 50 arranged in the up-down direction on the right side. Therefore, the manner of coupling between the power supply block 30 and the coupling block 50 arranged in the up-down direction on the left side will be described in detail, and the description of the manner of coupling between the power supply block 30 and the coupling block 50 arranged in the up-down direction on the right side will be omitted.

The power supply block 30 and the coupling block 50 are arranged such that the second through hole 37 and the third through hole 55 are arranged coaxially, i.e., the second conduction member 33 and the third conduction member 52 are arranged coaxially. The third connection port 39 of the power supply block 30 is opposed to the second coupling port 57 of the coupling block 50. The lower end surface of the block main body 31 abuts against the upper end surface of the coupling block main body 51.

As shown in FIGS. 10 and 12, a first fuse terminal 82 of a fuse 81 is inserted from the first fuse terminal insertion port 41 of the power supply block 30 into the first insertion hole 43. In the present embodiment, the first fuse terminal 82 corresponds to a "connection terminal". The fuse 81 includes two fuse terminals: the first fuse terminal 82 and a second fuse terminal 83. The first fuse terminal 82 comes into contact with the outer circumferential surface of the second conduction member 33 inside the first insertion hole 43 and thus is electrically connected to the second conduction member 33. The second fuse terminal 83 is inserted from the second fuse terminal insertion port 58 of the coupling block 50 into the second insertion hole 61. The second fuse terminal 83 comes into contact with the outer circumferential surface of the third conduction member 52 inside the second insertion hole 61 and thus is electrically connected to the third conduction member 52. That is, the second conduction member 33 and the third conduction member 52 are electrically connected to each other via the fuse 81.

Also, an output terminal 91 that is electrically connected to an electrical device 11 installed in the first installation area A1 is inserted from the output terminal insertion port 63 of the coupling block 50 into the third insertion hole 64. The output terminal 91 comes into contact with the outer circumferential surface of the third conduction member 52 inside the third insertion hole 64 and thus is electrically connected to the third conduction member 52.

Also, as shown in FIGS. 7 and 12, an earth terminal 92 that is electrically connected to the electrical device 11 is inserted from the earth terminal insertion port 65 of the coupling block 50 into the fourth insertion hole 66. In the present embodiment, the earth terminal 92 includes a conductive portion 93 that has a conductive property and a locking portion 94 that is provided at the leading end of the conductive portion 93.

For example, the conductive portion 93 is made of a metal that has good conductivity, such as copper, a copper alloy, aluminum, or an aluminum alloy. The conductive portion 93 in the present embodiment has a plate spring shape that generates a biasing force in a direction perpendicular to the insertion direction of the earth terminal 92 into the fourth insertion hole 66 in a state where the conductive portion 93 has been inserted into the fourth insertion hole 66. The insertion direction of the earth terminal 92 into the fourth insertion hole 66 is the same as the direction in which the fourth insertion hole 66 is recessed.

The locking portion 94 has an annular shape. The locking portion 94 has an annular shape with a size that conforms to the semicircular end surface of the fourth insertion hole 66 in the direction in which it is recessed. The surface of the locking portion 94 has an insulating property. The locking portion 94 may be made of an insulative resin material and provided at the leading end of the conductive portion 93 forming a single body with the conductive portion 93, for example. Alternatively, an insulation layer having an insulating property may be formed on the surface of the locking portion 94 through application, coating, plating, or the like.

The earth terminal 92 is inserted into the fourth insertion hole 66 until the locking portion 94 abuts against the end surface of the fourth insertion hole 66 in the direction in which it is recessed. Inside the fourth insertion hole 66, both sides of the conductive portion 93 in the up-down direction come into contact with the inner circumferential surface of the fourth insertion hole 66, and thus the conductive portion 93, i.e., the earth terminal 92 comes into contact with the ground layer 54 and is electrically connected to the ground layer 54. The conductive portion 93 having the plate spring shape biases the inner circumferential surface of the fourth insertion hole 66 in a direction perpendicular to the insertion direction of the earth terminal 92 into the fourth insertion hole 66. In the present embodiment, both sides of the conductive portion 93 in the up-down direction bias the inner circumferential surface of the fourth insertion hole 66 toward both sides of the up-down direction.

Also, a locking member 95 is inserted from the first coupling port 56 of the coupling block 50 into the third through hole 55. In the present embodiment, the first coupling port 56 corresponds to a "locking member insertion port". The locking member 95 is made of a conductive material. For example, the locking member 95 is made of a metal that has good conductivity, such as copper, a copper alloy, aluminum, or an aluminum alloy. The locking member 95 is inserted into the third through hole 55 to reach the inside of the third conduction member 52. At this time, the locking member 95 passes through the earth terminal 92 by passing the inside of the locking portion 94 of the earth terminal 92. More specifically, the locking member 95 passes through the locking portion 94 in a direction perpendicular to the direction in which the earth terminal 92 comes out of the fourth insertion hole 66. The outer circumferential surface of the locking member 95 comes into contact with the inner circumferential surface of the third conduction member 52, and thus the locking member 95 is electrically connected to the third conduction member 52. The lower end portion of the locking member 95 is exposed from the first coupling port 56.

In the power supply block 30 and the coupling block 50 coupled as described above, power distributed to the first conduction member 32 is supplied via the second conduction member 33, the fuse 81, and the third conduction member 52 to the electrical device 11. The power is also distributed from the third conduction member 52 to the locking member 95 in addition to the electrical device 11.

In the power supply block 30 and the coupling block 50 arranged in the up-down direction on the right side in FIG. 10, the locking member 95 does not necessarily have to be made of a conductive material. That is, the locking member 95 may also be made of an insulative material.

As shown in FIG. 10, in the first wiring unit 21, the two power supply blocks 30 and the two coupling blocks 50 are coupled to form a single piece as a whole. For example, the adjacent power supply blocks 30 may be fixed to each other, the adjacent coupling blocks 50 may be fixed to each other, and the power supply blocks 30 and the coupling blocks 50 adjacent to each other may be fixed to each other. Alternatively, a configuration is also possible in which the adjacent power supply blocks 30 are fixed to each other and the adjacent power supply blocks 30 and coupling blocks 50 are fixed to each other, but adjacent coupling blocks 50 are not fixed to each other. Note that the power supply blocks 30, the coupling blocks 50, and the power supply block 30 and the coupling block 50 can be fixed to each other using a known method such as snap-fit engagement using an engaging claw and an engaging protrusion, fitting a protrusion into a recess, or bonding.

Figure 13:
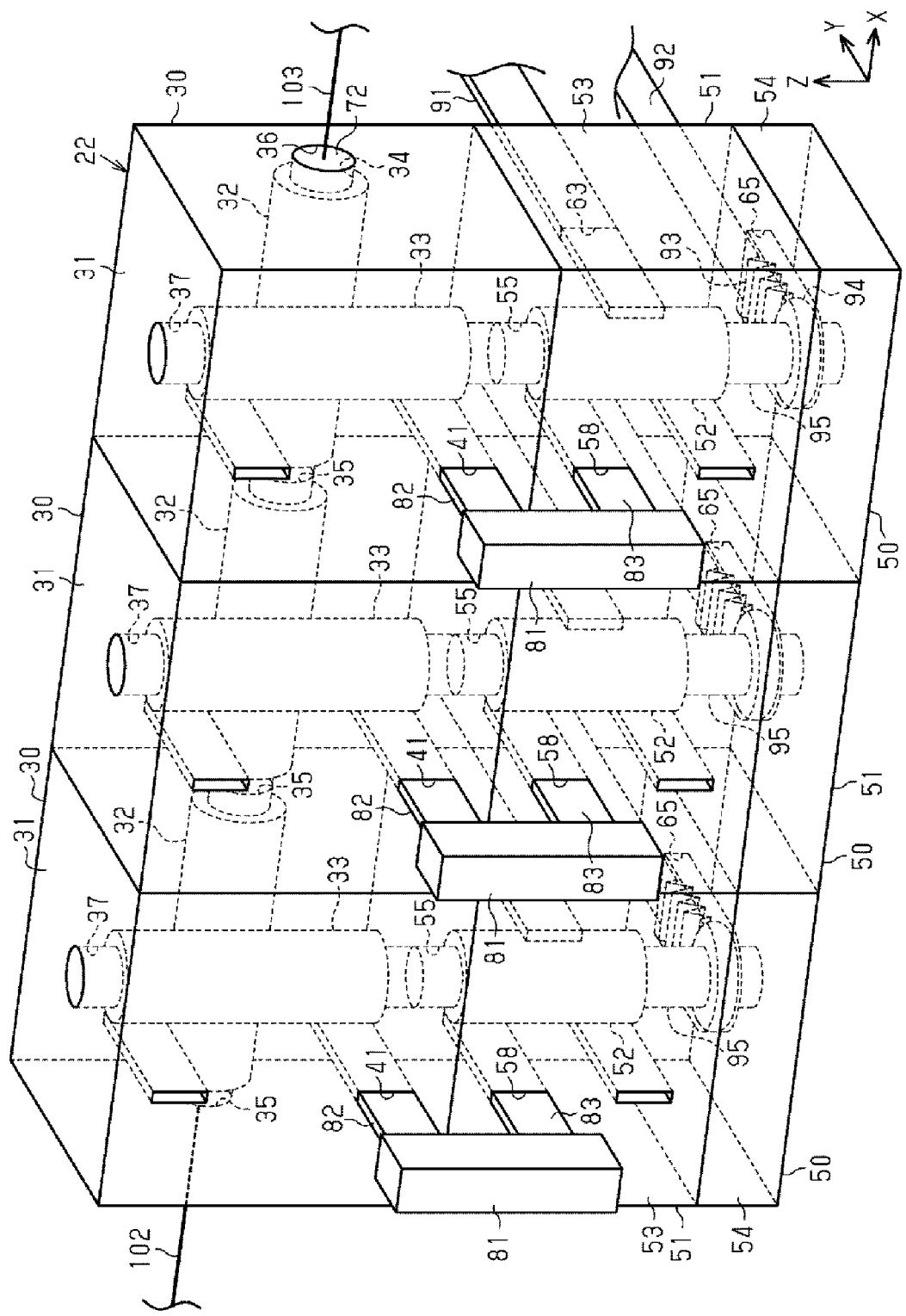
FIG. 13 is a perspective view schematically showing a second wiring unit according to an embodiment.

As shown in FIG. 13, the second wiring unit 22 includes three power supply blocks 30 and three coupling blocks 50. These power supply blocks 30 and coupling blocks 50 are coupled in the same manner as in the first wiring unit 21. In the second wiring unit 22 of the present embodiment, each of the coupling blocks 50 respectively arranged below the power supply blocks 30 corresponds to a "first coupling block".

In the second wiring unit 22, a second power supply terminal 72 that has the same outer diameter as the first power supply terminal 71 and is longer than the first power supply terminal 71 by the length of the block main body 31 in the left-right direction is inserted into the first through holes 34 of the three power supply blocks 30 arranged in the left-right direction. Electrical devices 12 installed in the second installation area A2 are respectively connected to the coupling blocks 50 of the second wiring unit 22 in the same manner as in the first wiring unit 21.

As shown in FIGS. 1 and 10, the third wiring unit 23 has the same configuration as the first wiring unit 21. In each of the two coupling blocks 50 included in the third wiring unit 23, the locking member 95 inserted from the first coupling port 56 into the third through hole 55 may be made of a conductive material or an insulative material. Electrical devices 13 installed in the third installation area A3 are respectively connected to the coupling blocks 50 of the third wiring unit 23 in the same manner as in the first wiring unit 21.

Figure 14:
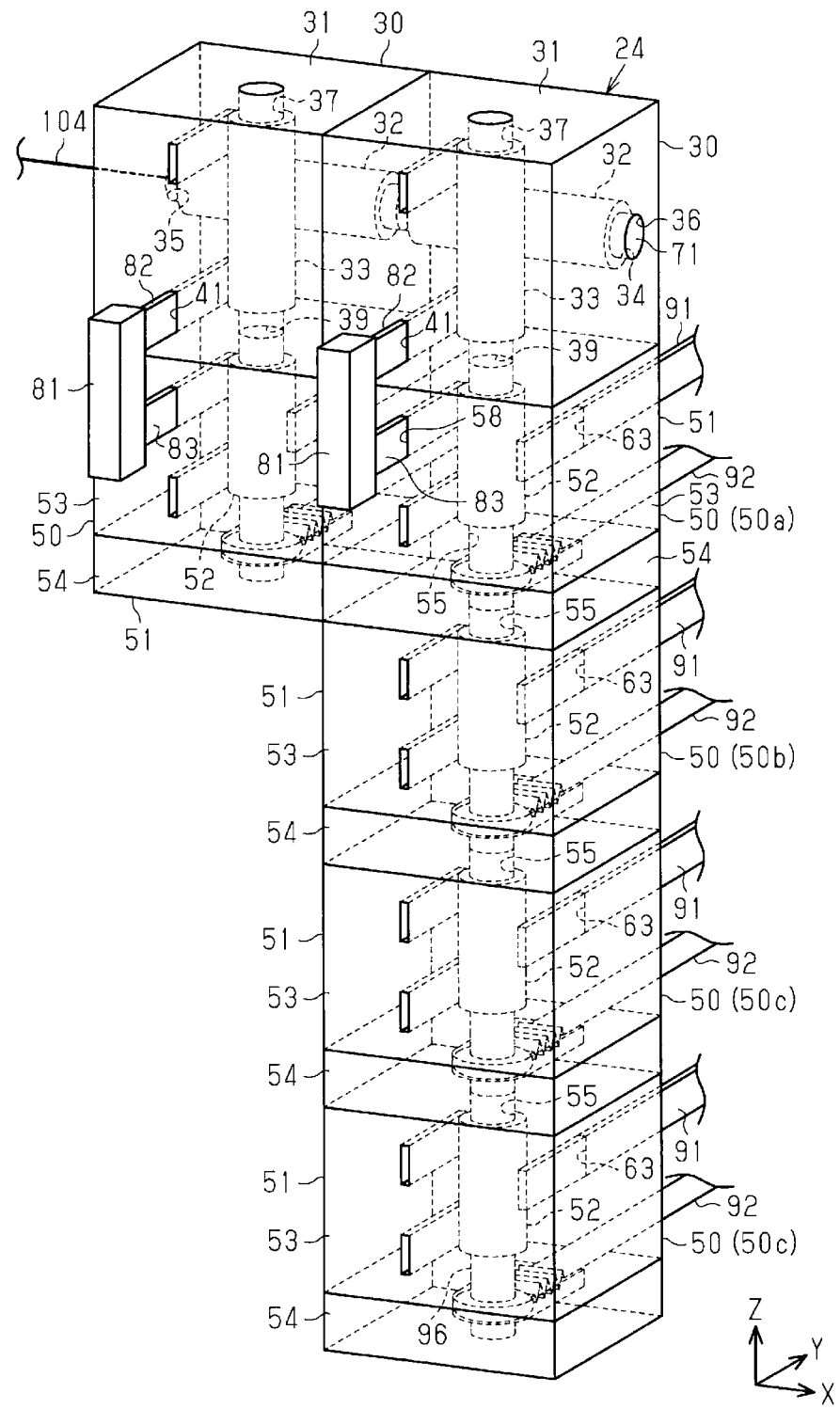
FIG. 14 is a perspective view schematically showing a fourth wiring unit according to an embodiment.

As shown in FIG. 14, the fourth wiring unit 24 includes two power supply blocks 30 and five coupling blocks 50. In the fourth wiring unit 24, the two power supply blocks 30 are arranged adjacent to each other in the left-right direction. A coupling block 50 is arranged below the left power supply block 30. This coupling block 50 corresponds to the "first coupling block". Furthermore, four coupling blocks 50 are arranged in the up-down direction below the right power supply block 30. The two power supply blocks 30 and the two coupling blocks 50 coupled to the two power supply blocks 30 are coupled in the same manner as the two power supply blocks 30 and the two coupling blocks 50 of the first wiring unit 21.

Figure 15:
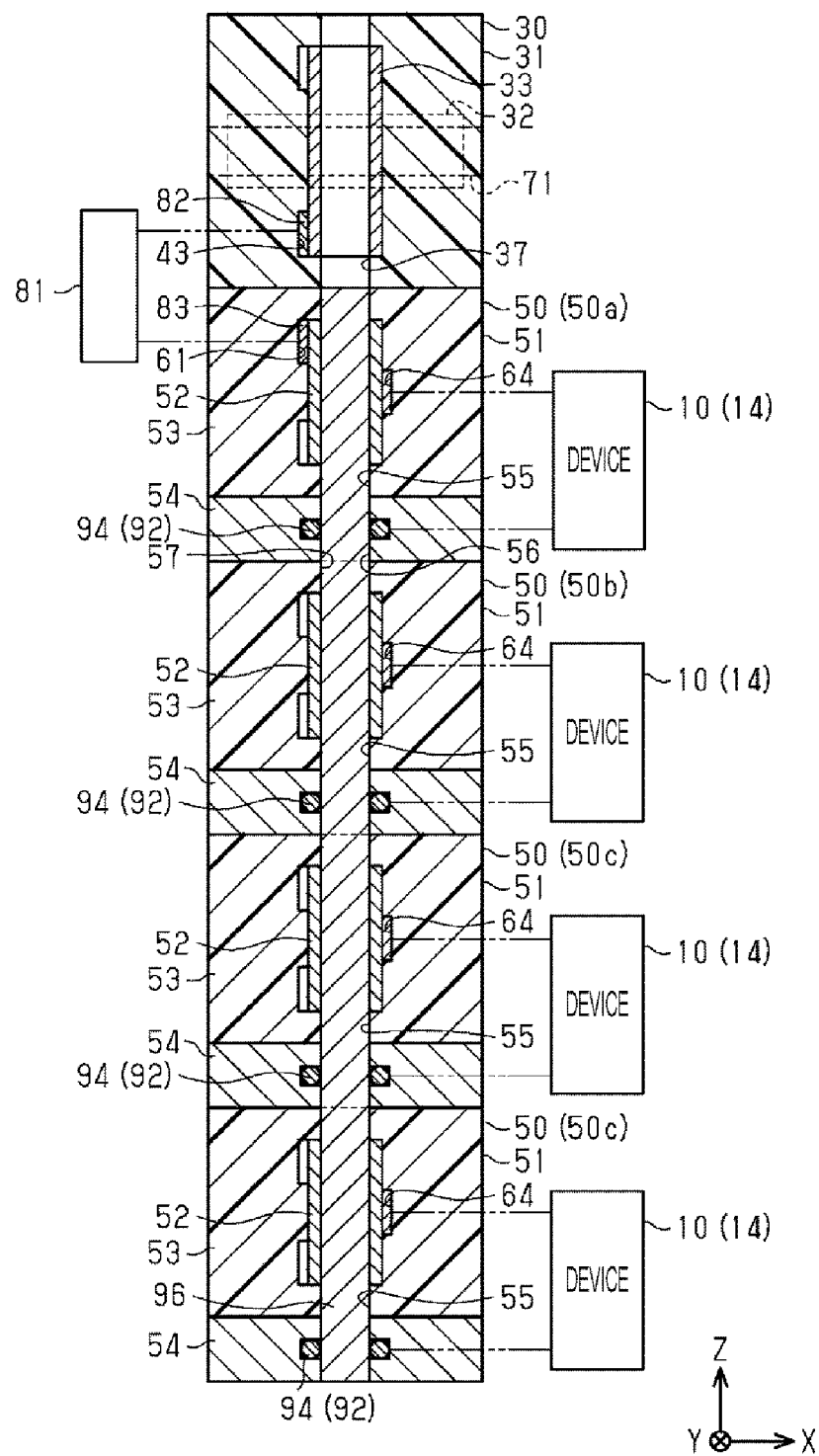
FIG. 15 is a cross-sectional view schematically showing a power supply block and coupling blocks coupled to each other according to an embodiment.

FIG. 15 is a cross-sectional view of the right power supply block 30 and the four coupling blocks 50 coupled to the right power supply block 30 in FIG. 14. Here, the coupling block 50 that is below the power supply block 30 and adjacent to the power supply block 30 will be referred to as a "first coupling block 50a". Also, the coupling block 50 that is below the first coupling block 50a and adjacent to the first coupling block 50a will be referred to as a "second coupling block 50b". Furthermore, the two coupling blocks 50 coupled to the lower side of the second coupling block 50*b* will be referred to as "third coupling blocks 50*c*". The coupling block main body 51 of the second coupling block 50*b* corresponds to a "second coupling block main body". The third conduction member 52 held inside the coupling block main body 51 of the second coupling block 50*b* corresponds to a "fourth conduction member". The coupling block main body 51 of each third coupling block 50*c* corresponds to a "third coupling block main body". The third conduction member 52 held inside the coupling block main body 51 of each third coupling block 50*c* corresponds to a "fifth conduction member". The third through hole 55 in the coupling block main body 51 of the first coupling block 50*a* corresponds to a "first coupling hole". The third through hole 55 in the coupling block main body 51 of the second coupling block 50*b* corresponds to a "second coupling hole". The third through hole 55 in the coupling block main body 51 of each third coupling block 50*c* corresponds to a "third coupling hole". The output terminal insertion port 63 of the first coupling block 50*a* corresponds to the "first output terminal insertion port". The output terminal insertion port 63 of the second coupling block 50*b* corresponds to a "second output terminal insertion port". The output terminal insertion port 63 of each third coupling block 50*c* corresponds to a "third output terminal insertion port".

The power supply block 30 and the first coupling block 50*a* are coupled in the same manner as the power supply block 30 and the coupling block 50 in the first wiring unit 21. The second coupling block 50*b* that is below the first coupling block 50*a* and adjacent to the first coupling block 50*a* is arranged such that the third through holes 55 of the coupling blocks 50*a* and 50*b* are arranged coaxially and the third conduction members 52 of the coupling blocks 50*a* and 50*b* are arranged coaxially. The first coupling port 56 of the first coupling block 50*a* is opposed to the second coupling port 57 of the second coupling block 50*b*. Also, the lower end surface of the coupling block main body 51 of the first coupling block 50*a* abuts against the upper end surface of the coupling block main body 51 of the second coupling block 50*b*.

The second coupling block 50*b* and the third coupling block 50*c* that is below the second coupling block 50*b* and adjacent to the second coupling block 50*b* are arranged in the same manner as the first coupling block 50*a* and the second coupling block 50*b*. Furthermore, the aforementioned third coupling block 50*c* and the other third coupling block 50*c* that is below the aforementioned third coupling block 50*c* and adjacent to the aforementioned third coupling block 50*c* are arranged in the same manner as the first coupling block 50*a* and the second coupling block 50*b*. Accordingly, the first coupling block 50*a*, the second coupling block 50*b*, and the two third coupling blocks 50*c*, i.e., the four coupling blocks 50 are arranged such that the four third through holes 55 are arranged coaxially. Also, the four coupling blocks 50 are arranged such that the four third conduction members 52 are arranged coaxially.

A coupling terminal 96 is inserted into the third conduction members 52 in the first coupling block 50*a*, the second coupling block 50*b*, and the two third coupling blocks 50*c*. The coupling terminal 96 is made of a conductive material. For example, the coupling terminal 96 is made of a metal material that has good conductivity, such as copper, a copper alloy, aluminum, or an aluminum alloy. The coupling terminal 96 is rod-shaped. In the present embodiment, the coupling terminal 96 has a circular column shape. The outer diameter of the coupling terminal 96 is such that the outer circumferential surface of the coupling terminal 96 comes into contact with the inner circumferential surfaces of the third conduction members 52 and is electrically connected thereto when the coupling terminal 96 is inserted into the third conduction members 52. Also, the outer diameter of the coupling terminal 96 is such that the coupling terminal 96 can pass through the inside of the third conduction members 52.

The coupling terminal 96 is inserted from the first coupling port 56 of the third coupling block 50*c* located at the lower end into the third through holes 55 of the first coupling block 50*a*, the second coupling block 50*b*, and the two third coupling blocks 50*c*. Thus, the coupling terminal 96 passes through the coupling block main bodies 51 of the first coupling block 50*a*, the second coupling block 50*b*, and the two third coupling blocks 50*c*. Also, the coupling terminal 96 passes through the third conduction members 52 of the first coupling block 50*a*, the second coupling block 50*b*, and the two third coupling blocks 50*c*. The outer circumferential surface of the coupling terminal 96 comes into contact with the inner circumferential surface of each of the four third conduction members 52, and thus the coupling terminal 96 is electrically connected to the third conduction members 52. Also, in each of the first to third coupling blocks 50*a* to 50*c*, the coupling terminal 96 passes through the locking portion 94 of the earth terminal 92, which is inserted into the output terminal insertion port 63, in the direction in which the third through hole 55 extends. In the fourth wiring unit 24, the coupling terminal 96 also serves as a "locking member".

When inserting the coupling terminal 96 into the first to third coupling blocks 50*a* to 50*c*, the order in which the first to third coupling blocks 50*a* to 50*c* and the coupling terminal 96 are assembled is not limited so long as the coupling blocks are arranged in the order of the first coupling block 50*a*, the second coupling block 50*b*, and the two third coupling blocks 50*c*. For example, the upper end portion of the coupling terminal 96 may also be inserted from the first coupling port 56 of the first coupling block 50*a* into the third through hole 55 of the first coupling block 50*a*. Thereafter, the lower end portion of the coupling terminal 96 is inserted into the second coupling port 57 of the second coupling block 50*b*. Then, the second coupling block 50*b* is moved to be adjacent to the first coupling block 50*a* while the coupling terminal 96 is passed through the third through hole 55 of the second coupling block 50*b*. Thereafter, the coupling terminal 96 is passed through the two third coupling blocks 50*c* in the same manner as in the second coupling block 50*b*. Alternatively, the coupling terminal 96 may be inserted into the third through holes 55 of the first to third coupling blocks 50*a* to 50*c* after the coupling blocks are arranged in the order of the first coupling block 50*a*, the second coupling block 50*b*, and the two third coupling blocks 50*c*.

Electrical devices 14 installed in the fourth installation area A4 are respectively connected to the first coupling block 50*a*, the second coupling block 50*b*, and the third coupling blocks 50*c* in the same manner as in the first wiring unit 21.

As shown in FIGS. 14 and 15, in the fourth wiring unit 24, power distributed to the first conduction member 32 of the right power supply block 30 is supplied via the second conduction member 33, the fuse 81, and the third conduction member 52 of the first coupling block 50*a* to an electrical device 14. The power is also distributed from the third conduction member 52 to the coupling terminal 96 in addition to the electrical device 14. The power distributed to the coupling terminal 96 is distributed from the coupling terminal 96 via the third conduction members 52 of the second coupling block 50b and the third coupling blocks 50c to the electrical devices 14 electrically connected to the third conduction members 52.

[Configuration of Wiring System]

Next, the configuration of the wiring system 1 will be described.

As shown in FIG. 1, the wiring system 1 includes a first wire 101 that electrically connects the battery 20 and the first power supply terminal 71 included in the first wiring unit 21. The wiring system 1 includes a second wire 102 that electrically connects the first power supply terminal 71 included in the first wiring unit and the second power supply terminal 72 included in the second wiring unit 22. The wiring system 1 includes a third wire 103 that electrically connects the second power supply terminal 72 included in the second wiring unit 22 and the first power supply terminal 71 included in the third wiring unit 23. Furthermore, the wiring system 1 includes a fourth wire 104 that electrically connects the first power supply terminal 71 included in the first wiring unit 21 and the first power supply terminal 71 included in the fourth wiring unit 24. The first wiring unit 21 side end portion of the fourth wire 104 is electrically connected to the conductive locking member 95. That is, the first wiring unit 21 side end portion of the fourth wire 104 is indirectly electrically connected to the first power supply terminal 71 included in the first wiring unit 21 via the locking member 95 of the left coupling block 50 in the first wiring unit 21, the third conduction member 52, the fuse 81, the second conduction member 33 of the left power supply block 30, and the first conduction member 32.

The following describes the functionality of the present embodiment.

Power supplied from the battery 20 via the first wire 101 to the first wiring unit 21 is distributed by the first wiring unit 21 to the electrical devices 11 installed in the first installation area A1. Furthermore, power supplied via the first wire 101 to the first wiring unit 21 is distributed via the second wire 102 to the second wiring unit 22 and distributed via the fourth wire 104 to the fourth wiring unit 24. Power distributed to the second wiring unit 22 is distributed by the second wiring unit 22 to the electrical devices 12 installed in the second installation area A2. Likewise, power distributed to the fourth wiring unit 24 is distributed by the fourth wiring unit 24 to the electrical devices 14 installed in the fourth installation area A4. Furthermore, power distributed via the second wire 102 to the second wiring unit 22 is distributed via the third wire 103 to the third wiring unit 23. Power distributed to the third wiring unit 23 is distributed by the third wiring unit 23 to the electrical devices 13 installed in the third installation area A3.

The following describes effects of the present embodiment.

(1) The power supply block 30 includes the block main body 31 that includes the first insertion port 35 for inserting the first power supply terminal 71 or the second power supply terminal 72 and the first fuse terminal insertion port 41 for inserting the first fuse terminal 82. Also, the power supply block 30 includes the conductive first conduction member 32 that is held inside the block main body 31 and configured to be electrically connected to the first power supply terminal 71 or the second power supply terminal 72. Furthermore, the power supply block 30 includes the conductive second conduction member 33 that is held inside the block main body 31, is electrically connected to the first conduction member 32 inside the block main body 31, and is configured to be electrically connected to the first fuse terminal 82.

According to this aspect, the power supply block 30 can be supplied with power from the first power supply terminal 71 or the second power supply terminal 72 inserted into the first insertion port 35. Also, power supplied to the first power supply terminal 71 or the second power supply terminal 72 can be distributed via the first conduction member 32, the second conduction member 33, and the first fuse terminal 82. The number of first fuse terminals 82 that can be connected can be easily increased or reduced by changing the number of power supply blocks 30 to be used. Accordingly, a power supply block 30 suitable to be shared among different types or classes of vehicles can be obtained.

(2) With the use of the power supply block 30, power supplied to the first power supply terminal 71 or the second power supply terminal 72 can be distributed via the fuse 81.

(3) The block main body 31 includes the first through hole 34 extending through the block main body 31, and the first insertion port 35 is an opening on one side of the first through hole 34. The first conduction member 32 is exposed to the inside of the first through hole 34.

According to this aspect, the first conduction member 32 is exposed to the inside of the first through hole 34, and therefore, the first power supply terminal 71 or the second power supply terminal 72 can be electrically connected to the first conduction member 32 by being inserted from the first insertion port 35 into the first through hole 34. When the first power supply terminal 71 is passed through the first through holes 34 of a plurality of power supply blocks 30, the first power supply terminal 71 can be electrically connected to the first conduction members 32 included in the plurality of power supply blocks 30. Accordingly, power supplied to the single first power supply terminal 71 can be distributed to the plurality of power supply blocks 30. Likewise, when the second power supply terminal 72 is passed through the first through holes 34 of a plurality of power supply blocks 30, the second power supply terminal 72 can be electrically connected to the first conduction members 32 included in the plurality of power supply blocks 30. Accordingly, power supplied to the single second power supply terminal 72 can be distributed to the plurality of power supply blocks 30.

(4) The first wiring unit 21 includes the power supply block 30 and the coupling block 50 that includes the coupling block main body 51 and the conductive third conduction member 52 held inside the coupling block main body 51. The coupling block main body 51 includes the second fuse terminal insertion port 58 for inserting the second fuse terminal 83 of the fuse 81 including the first fuse terminal 82 inserted into the first fuse terminal insertion port 41. The second fuse terminal 83 inserted into the second fuse terminal insertion port 58 is electrically connected to the third conduction member 52.

According to this aspect, the fuse 81 can be easily connected between the second conduction member 33 and the third conduction member 52. The same effect can be achieved in the second to fourth wiring units 22 to 24 as well.

(5) In the first wiring unit 21, the coupling block main body 51 includes the output terminal insertion port 63 for inserting the output terminal 91. The output terminal 91 inserted into the output terminal insertion port 63 is electrically connected to the third conduction member 52.

According to this aspect, in the first wiring unit 21, power supplied to the first power supply terminal 71 can be distributed via the output terminal 91 to the electrical device 11 or the like electrically connected to the output terminal 91. The same effect can be achieved in the second to fourth wiring units 22 to 24 as well.

(6) The first wiring unit 21 includes a plurality of power supply blocks 30, and the first fuse terminals 82 of different fuses 81 are respectively inserted into the first fuse terminal insertion ports 41 of the plurality of power supply blocks 30. Furthermore, the first wiring unit 21 includes the same number of coupling blocks 50 as the fuses 81. The plurality of second fuse terminals 83 are respectively inserted into the second fuse terminal insertion ports 58 of different coupling blocks 50.

According to this aspect, the number of fuses 81 included in the first wiring unit 21 can be easily changed by combining the power supply blocks 30 and the coupling blocks 50. Accordingly, the required number of fuses 81 can be provided in the first wiring unit 21 according to the type or class of the vehicle. The same effect can be achieved in the second to fourth wiring units 22 to 24 as well.

(7) The fourth wiring unit 24 includes the second coupling block 50b that includes the coupling block main body 51 and the conductive third conduction member 52 held inside the coupling block main body 51. In the fourth wiring unit 24, the coupling block main body 51 of the first coupling block 50a includes the first coupling port 56 for inserting the coupling terminal 96. In the fourth wiring unit 24, the coupling block main body 51 of the second coupling block 50b includes the second coupling port 57 for inserting the coupling terminal 96 inserted into the first coupling port 56 and the output terminal insertion port 63 for inserting an output terminal 91 other than the output terminal 91 inserted into the output terminal insertion port 63 of the first coupling block 50a. The coupling terminal 96 inserted into the first coupling port 56 is electrically connected to the third conduction member 52 of the first coupling block 50a. The coupling terminal 96 inserted into the second coupling port 57 and the output terminal 91 inserted into the output terminal insertion port 63 of the second coupling block 50b are electrically connected to the third conduction member 52 of the second coupling block 50b.

According to this aspect, in the fourth wiring unit 24, power supplied to the first power supply terminal 71 can be distributed via the output terminal 91 inserted into the output terminal insertion port 63 of the first coupling block 50a and the output terminal 91 inserted into the output terminal insertion port 63 of the second coupling block 50b to the electrical devices 14 electrically connected to the output terminals 91. Also, the output terminal 91 inserted into the output terminal insertion port 63 of the first coupling block 50a is connected to the fuse 81 via the third conduction member 52 of the first coupling block 50a. Furthermore, the output terminal 91 inserted into the output terminal insertion port 63 of the second coupling block 50b is connected to the same fuse 81 via the third conduction member 52 of the second coupling block 50b, the coupling terminal 96, and the third conduction member 52 of the first coupling block 50a. Therefore, a configuration in which the output terminals 91 are electrically connected to the same fuse 81 can be realized without a configuration for making a splice connection of wires.

(8) The fourth wiring unit 24 includes the two third coupling blocks 50c each including the coupling block main body 51 and the conductive third conduction member 52 held inside the coupling block main body 51. The coupling block main body 51 of the first coupling block 50a includes the third through hole 55 extending through the coupling block main body 51. The first coupling port 56 is the opening on one side of the third through hole 55 in the coupling block main body 51 of the first coupling block 50a. The third conduction member 52 in the first coupling block 50a is exposed to the inside of the third through hole 55 in the coupling block main body 51 of the first coupling block 50a. The coupling block main body 51 of the second coupling block 50b includes the third through hole 55 extending through the coupling block main body 51. The second coupling port 57 is the opening on one side of the third through hole 55 in the coupling block main body 51 of the second coupling block 50b. The third conduction member 52 in the second coupling block 50b is exposed to the inside of the third through hole 55 in the coupling block main body 51 of the second coupling block 50b. The coupling block main body 51 of each third coupling block 50c includes the third through hole 55 extending through the coupling block main body 51 and the output terminal insertion port 63 for inserting an output terminal other than the output terminal 91 inserted into the output terminal insertion port 63 of the first coupling block 50a and the output terminal 91 inserted into the output terminal insertion port 63 of the second coupling block 50b. The third conduction member 52 in the coupling block main body 51 of each third coupling block 50c is exposed to the inside of the third through hole 55 in the coupling block main body 51, and the output terminal 91 inserted into the output terminal insertion port 63 of the coupling block main body 51 is electrically connected to the third conduction member 52. The coupling terminal 96 passes through the third through holes 55 of the first to third coupling blocks 50a to 50c and is electrically connected to the third conduction members 52 inside the third through holes 55.

According to this aspect, in the fourth wiring unit 24, the coupling terminal 96 passes through the third through holes 55 of the first to third coupling blocks 50a to 50c and thus is electrically connected to the third conduction members 52 of the first to third coupling blocks 50a to 50c. With this configuration, the coupling terminal 96 can be easily electrically connected to the third conduction members 52 of the first to third coupling blocks 50a to 50c. Furthermore, power distributed to the coupling terminal 96 via the first power supply terminal 71, the first conduction member 32, the second conduction member 33, the fuse 81, and the third conduction member 52 of the first coupling block 50a can be distributed to the plurality of electrical devices 14 via the third conduction member 52 of the second coupling block 50b and the third conduction members 52 of the third coupling blocks 50c.

(9) The coupling block main body 51 includes the power distribution layer 53 that is made of an insulative material and holds the third conduction member 52 and the ground layer 54 that is made of a conductive material and is grounded. The ground layer 54 includes the earth terminal insertion port 65 for inserting the earth terminal 92, and the earth terminal 92 inserted into the earth terminal insertion port 65 is electrically connected to the ground layer 54.

According to this aspect, the earth terminal 92 can be grounded via the ground layer 54 in each coupling block 50.

(10) The ground layer 54 includes the first coupling port 56 for inserting the locking member 95 or the coupling terminal 96 that passes through the earth terminal 92 inside the ground layer 54.

According to this aspect, the locking member 95 or the coupling terminal 96 inserted into the first coupling port 56 can keep the earth terminal 92 from coming out of the ground layer 54.

(11) In the wiring system 1, the wiring units 21 to 24 are respectively arranged in the installation areas A1 to A4, and at least one electrical device 10 is installed in each of the installation areas. That is, the first wiring unit 21 is arranged in the first installation area A1, and the second wiring unit 22 is arranged in the second installation area A2. Furthermore, the third wiring unit 23 is arranged in the third installation area A3, and the fourth wiring unit 24 is arranged in the fourth installation area A4. The wiring units 21 to 24 distribute power supplied from the first power supply terminal 71 or the second power supply terminal 72 via the first fuse terminal 82 to each electrical device 10 installed in the installation areas in which the wiring units are arranged.

According to this aspect, the power supply block 30 and the coupling block 50 can be shared between the wiring units 21 to 24 arranged in the different installation areas A1 to A4. This eliminates the need to design components for the respective wiring units 21 to 24 arranged in the different installation areas A1 to A4, and wiring units 21 and 24 suitable for the respective installation areas A1 to A4 can be formed by combining the power supply block 30, the coupling block 50, and the like. The number of fuses 81 can be made appropriate for each of the installation areas A1 to A4 by combining the power supply blocks 30, the coupling blocks 50, and the like. Accordingly, each of the wiring units 21 to 24 arranged in the installation areas A1 to A4 can be provided with an appropriate number of fuses 81 according to the electrical devices 10 installed in the corresponding installation area.

(12) The wiring system 1 includes the wires 102 to 104 that electrically connect the power supply terminals 71 and 72 included in different wiring units 21 to 24.

According to this aspect, power can be supplied from the first power supply terminal 71 of the first wiring unit 21 via the second wire 102 to the second power supply terminal 72 of the second wiring unit 22. Power can be distributed from the second power supply terminal 72 of the second wiring unit 22 via the third wire 103 to the first power supply terminal 71 of the third wiring unit 23. Power can be supplied from the first power supply terminal 71 of the first wiring unit 21 via the fourth wire 104 to the first power supply terminal 71 of the fourth wiring unit 24. Accordingly, power can be distributed from the common battery 20 to the plurality of wiring units 21 to 24.

(13) The coupling block main body 51 includes the third through hole 55 that extends through the power distribution layer 53 and the ground layer 54 of the coupling block main body 51. The third conduction member 52 is exposed to the inside of the third through hole 55. The locking member 95 is inserted from the first coupling port 56, which is the opening on one side of the third through hole 55, into the third through hole 55 and passes through the earth terminal 92.

According to this aspect, the third through hole 55 in which the third conduction member 52 is exposed can be used to keep the earth terminal 92 from coming out of the ground layer 54.

(14) The earth terminal 92 includes the conductive portion 93 having the plate spring shape that generates a biasing force in a direction perpendicular to the insertion direction of the earth terminal 92 into the fourth insertion hole 66 in the state where the earth terminal 92 has been inserted into the fourth insertion hole 66. Accordingly, the conductive portion 93 is pressed against the inner circumferential surface of the fourth insertion hole 66. Therefore, even if the coupling block 50 vibrates while the vehicle is moving, for example, the earth terminal 92 can be stably electrically connected to the ground layer 54.

(15) All of the first to fourth wiring units 21 to 24 are formed using two types of wiring blocks: power supply blocks 30 and coupling blocks 50. Accordingly, the first to fourth wiring units 21 to 24 can be formed using a small number of types of components. Also, the components can be managed easily.

(16) Even when a design change is made for the vehicle, the wiring system can be adapted to the design change by changing the combination of the power supply blocks 30 and the coupling blocks 50. Therefore, even when a design change is made for the vehicle, there is no need to make new molds, for example, and accordingly, the manufacturing cost can be reduced.

The present embodiment can also be implemented with the following changes. The present embodiment and the following variations can be implemented in combination so long as there are no technical contradictions.

In the above embodiment, the wiring system 1 includes the wires 102 to 104 that electrically connect the power supply terminals 71 and 72 included in different wiring units 21 to 24. However, the wiring system 1 may also be configured such that the power supply terminals 71 and 72 of the wiring units 21 to 24 are electrically connected to the battery via a wire. For example, in the above embodiment, another end of the second wire 102 other than the end connected to the second power supply terminal 72 of the second wiring unit 22 may be connected to the battery 20 rather than the first power supply terminal 71 of the first wiring unit 21. The third wire 103 and the fourth wire 104 may also be changed similarly.

In the above embodiment, the wiring system 1 includes four wiring units: the first to fourth wiring units 21 to 24. However, the number of wiring units included in the wiring system 1 is not limited to four. The wiring system 1 is only required to include at least one wiring unit for each of the installation areas in which electrical devices 10 are installed.

In the above embodiment, the earth terminal 92 is kept from coming out of the ground layer 54 by the locking member 95 or the coupling terminal 96 inserted into the third through hole 55 and passing through the locking portion 94 of the earth terminal 92. However, the configuration for keeping the earth terminal 92 from coming out of the ground layer 54 is not limited to this configuration. For example, in addition to the third through hole 55, a retaining hole that intersects the fourth insertion hole 66 may be formed in the ground layer 54, and the locking member 95 may be inserted into the retaining hole while passing through the earth terminal 92. Also, in the above embodiment, the first coupling port 56, which is the opening on one side of the third through hole 55, serves as the "locking member insertion port", but the second coupling port 57, which is the opening on the other side, may also be used as the "locking member insertion port". Also, the coupling block 50 does not necessarily have to include the configuration for keeping the earth terminal 92 from coming out of the ground layer 54.

The shape of the earth terminal 92 is not limited to the shape described in the above embodiment. For example, the conductive portion 93 does not necessarily have to have a plate spring shape so long as the conductive portion 93 can come into contact with the ground layer 54 to be electrically connected to the ground layer 54. Also, for example, the surface of the locking portion 94 may be conductive. In this case, in order to prevent electrical connection between the coupling terminal 96 and the ground layer 54 via the locking portion 94, an insulative layer that is insulating is formed through application, coating, plating, or the like on the inner circumferential surface of a portion of the fourth insertion hole 66 in which the locking portion 94 is arranged, i.e., a bottom side portion of the fourth insertion hole 66 with respect to a portion in which the conductive portion 93 is arranged. Note that the insulative layer provided on the inner circumferential surface of the fourth insertion hole 66 may be further provided on the coupling block 50 in the above embodiment. Also, the earth terminal 92 does not necessarily have to include the locking portion 94.

In the above embodiment, the coupling terminal 96 is insulated from the ground layer 54 by the insulative film provided on the inner circumferential surface of the portion of the third through hole 55 included in the ground layer 54. The configuration for insulating the coupling terminal 96 from the ground layer 54 is not limited to this configuration. For example, an insulative film may also be provided on the outer circumferential surface of a portion of the coupling terminal 96 arranged in the ground layer 54. In this case, an insulative film may be optionally provided on the inner circumferential surface of the portion of the third through hole 55 included in the ground layer 54.

In the above embodiment, the ground layer 54 is provided on the lower end surface of the power distribution layer 53. However, the position at which the ground layer 54 is provided in the coupling block main body 51 is not limited to this position. For example, the ground layer 54 may be provided on the upper end surface of the power distribution layer 53. Also, the number of ground layers 54 included in the coupling block main body 51 is not limited to one, and may be two or more. Also, the coupling block main body 51 does not necessarily have to include the ground layer 54.

The number of power supply blocks 30 and the number of coupling blocks 50 included in each of the first to fourth wiring units 21 to 24, the arrangement of the power supply blocks 30 and the coupling blocks 50, and the manner of connection between these blocks may be changed as appropriate. Also, in each of the first to fourth wiring units 21 to 24, the number of fuses 81 and positions at which the fuses 81 are connected can be changed by changing the number of power supply blocks 30, the number of coupling blocks 50, the arrangement of the power supply blocks 30 and the coupling blocks 50, and the manner of connection between these blocks.

For example, in the fourth wiring unit 24 of the above embodiment shown in FIG. 14, it is conceivable to omit the fuse 81 connected between the second conduction member 33 of the right power supply block 30 and the third conduction member 52 of the first coupling block 50a arranged below the right power supply block 30. In this case, the second conduction member 33 of the power supply block 30 can be electrically connected to the third conduction members 52 of the first to third coupling blocks 50a to 50c via the coupling terminal 96 that passes through the second through hole 37 of the power supply block 30 and the third through holes 55 of the first to third coupling blocks 50a to 50c. In this case, the lower opening of the second through hole 37 corresponds to the "second insertion port", and the coupling terminal 96 corresponds to the "connection terminal".

Also, for example, in the fourth wiring unit 24 of the above embodiment shown in FIG. 14, a fuse 81 may be connected between the third conduction members 52 of the two third coupling blocks 50c. In this case, the first fuse terminal 82 of the fuse 81 is inserted into the third fuse terminal insertion port 59 of the upper third coupling block 50c. Furthermore, the second fuse terminal 83 of the fuse 81 is inserted into the second fuse terminal insertion port 58 of the lower third coupling block 50c. The coupling terminal 96 is not inserted into the third through holes 55 of the third coupling blocks 50c, and is inserted only into the third through hole 55 of the first coupling block 50a and the third through hole 55 of the second coupling block 50b.

Also, coupling blocks 50 may be arranged on both sides of the power supply block 30 in the up-down direction.

The shape of the coupling terminal 96 is not limited to the circular column shape. For example, the coupling terminal 96 preferably has a rod shape that allows the coupling terminal 96 to pass through the third through hole 55 of the coupling block 50. For example, the coupling terminal 96 may have a hollow cylindrical shape. Alternatively, the coupling terminal 96 may include a rod-shaped portion with an outer diameter smaller than the inner diameter of the third through hole 55 and a connection portion that forms a single piece together with the rod-shaped portion and has a larger outer diameter than the rod-shaped portion to come into contact with the inner circumferential surface of the third conduction member 52.

The first conduction member 32 does not necessarily have to be arranged in the center portion in the direction in which the first through hole 34 extends so long as both end portions of the first conduction member 32 in the axial direction do not protrude to the outside of the block main body 31. That is, so long as the first conduction member 32 is held inside the block main body 31 and the first power supply terminal 71 or the second power supply terminal 72 inserted into the first insertion port 35 can be electrically connected to the first conduction member 32, the first conduction member 32 may be arranged at any position inside the block main body 31.

The second conduction member 33 does not necessarily have to be arranged in the center portion in the axial direction of the second through hole 37 so long as both end portions of the second conduction member 33 in the axial direction do not protrude to the outside of the block main body 31. That is, so long as the second conduction member 33 is held inside the block main body 31 and electrically connected to the first conduction member 32 inside the block main body 31 and the first fuse terminal 82 inserted into the first fuse terminal insertion port 41 can be electrically connected to the second conduction member 33, the second conduction member 33 may be arranged at any position in the block main body 31.

In the above embodiment, the center portion of the first through hole 34 in the direction in which it extends is in contact with the center portion of the second through hole 37 in the direction in which it extends, electrically connecting the first conduction member 32 and the second conduction member 33 inside the block main body 31. However, the first through hole 34 may be in contact with the second through hole 37 at a position that is shifted from the center portion in the direction in which the first through hole 34 extends. Also, the second through hole 37 may be in contact with the first through hole 34 at a position that is shifted from the center portion in the direction in which the second through hole 37 extends. In this case, the outer circumferential surface of the first conduction member 32 is exposed to the inside of the second through hole 37 in the portion of the first through hole 34 that is in contact with the second through hole 37 and is not limited to the center portion in the direction in which the first through hole 34 extends. Likewise, the outer circumferential surface of the second conduction member 33 is exposed to the inside of the first through hole 34 in the portion of the second through hole 37 that is in contact with the first through hole 34 and is not limited to the center portion in the direction in which the second through hole 37 extends. The first conduction member 32 and the second conduction member 33 are electrically connected through the contact between the outer circumferential surface of the first conduction member 32 exposed to the inside of the second through hole 37 and the outer circumferential surface of the second conduction member 33 exposed to the inside of the first through hole 34.

The positions of the first through hole 34 and the second through hole 37 in the block main body 31 are not limited to those in the above embodiment. The positions of the first through hole 34 and the second through hole 37 are only required to be set such that the first conduction member 32 arranged inside the first through hole 34 and the second conduction member 33 arranged inside the second through hole 37 can be electrically connected to each other inside the block main body 31.

The position of the third through hole 55 in the coupling block main body 51 is not limited to the position in the above embodiment. The position of the third through hole 55 is only required to be set such that the second fuse terminal 83 inserted into the second fuse terminal insertion portion 58, the first fuse terminal 82 inserted into the third fuse terminal insertion port 59, and the output terminal 91 inserted into the output terminal insertion port 63 can be electrically connected to the third conduction member 52 arranged inside the third through hole 55.

The third conduction member 52 does not necessarily have to be arranged in the portion of the third through hole 55 located in the center portion of the power distribution layer 53 in the up-down direction so long as both end portions of the third conduction member 52 in the axial direction do not protrude to the outside of the coupling block main body 51. That is, so long as the third conduction member 52 is held inside the coupling block main body 51 and the second fuse terminal 83 inserted into the second fuse terminal insertion port 58 and the first fuse terminal 82 inserted into the third fuse terminal insertion port 59 can be electrically connected to the third conduction member 52, the third conduction member 52 may be arranged at any position inside the coupling block main body 51. Furthermore, the position of the third conduction member 52 is preferably set such that the output terminal 91 inserted into the output terminal insertion port 63 can be electrically connected to the third conduction member 52. However, the third conduction member 52 is not electrically connected to the ground layer 54.

At least one wiring unit of the first to fourth wiring units 21 to 24 may include a coupling block 50 that does not include the output terminal insertion port 63.

At least one wiring unit of the first to fourth wiring units 21 to 24 may include a coupling block 50 that does not include at least one of the second fuse terminal insertion port 58 and the third fuse terminal insertion port 59.

The first conduction member 32, the second conduction member 33, and the third conduction member 52 do not necessarily have to have the hollow cylindrical shapes. The first conduction member 32 is only required to have a shape that allows the first power supply terminal 71 or the second power supply terminal 72 inserted into the first insertion port 35 to be electrically connected to the first conduction member 32. The second conduction member 33 is only required to have a shape that allows the second conduction member 33 to be electrically connected to the first conduction member 32 and allows the first fuse terminal 82 inserted into the first fuse terminal insertion port 41 to be electrically connected to the second conduction member 33. The third conduction member 52 is only required to have a shape that allows the coupling terminal 96 inserted into the third through hole 55 to be electrically connected to the third conduction member 52. For example, the first to third conduction members 32, 33, and 52 may have tubular shapes other than the hollow cylindrical shapes, such as polygonal tubular shapes or elliptical tubular shapes. Also, the first conduction member 32 need not have an annular shape when viewed in the direction in which the first through hole 34 extends, for example. The first conduction member 32 may have a plate-like shape to be exposed to the inner circumferential surface of the first through hole 34, for example. The second conduction member 33 and the third conduction member 52 may also be changed similarly.

At least one wiring unit of the first to fourth wiring units 21 to 24 may include a power supply block 30 in which the first connection port 36 is closed. The power supply block 30 in which the first connection port 36 is closed can be used when the wiring unit includes only one power supply block 30, for example. Alternatively, the power supply block 30 in which the first connection port 36 is closed may be used as the power supply block 30 that is located at an end among a plurality of power supply blocks 30 arranged side by side in the third wiring unit 23 or the fourth wiring unit 24.

The number of first fuse terminal insertion ports 41 and 42 included in the power supply block 30 may be changed as appropriate. Also, at least one wiring unit of the first to fourth wiring units 21 to 24 may include a power supply block 30 that does not include the first fuse terminal insertion ports 41 and 42.

The shapes of the first power supply terminal 71 and the second power supply terminal 72 are not limited to the circular column shapes. The first and second power supply terminals 71 and 72 preferably have rod shapes that allow the first and second power supply terminals 71 and 72 to pass through the first through hole 34 of the power supply block 30. For example, the first and second power supply terminals 71 and 72 may have hollow cylindrical shapes. Alternatively, the first and second power supply terminals 71 and 72 may each include a rod-shaped portion with an outer diameter smaller than the inner diameter of the first through hole 34 and a connection portion that forms a single piece together with the rod-shaped portion and has a larger outer diameter than the rod-shaped portion to come into contact with the inner circumferential surface of the first conduction member 32.

In the above embodiment, the first conduction member 32 and the second conduction member 33 are electrically connected to each other through contact between the outer circumferential surfaces of the conduction members. However, the method for electrically connecting the first conduction member 32 and the second conduction member 33 is not limited to this method. For example, the first conduction member 32 and the second conduction member 33 may be electrically connected via a conductive connection member that is provided inside the block main body 31. Alternatively, the first conduction member 32 and the second conduction member 33 may be electrically connected by being formed together as a single piece.

The shape of the block main body 31 is not limited to a cubic shape. The block main body 31 may also have a rectangular parallelepiped shape, a truncated cone shape, or a truncated pyramid shape, for example.

The shape of the coupling block main body 51 is not limited to a cubic shape. The coupling block main body 51 may also have a rectangular parallelepiped shape, a truncated cone shape, or a truncated pyramid shape, for example.

The positions of the openings in the power supply block 30, such as the first insertion port 35 and the first fuse terminal insertion ports 41 and 42 may be changed as appropriate.

The positions of the openings in the coupling block 50, such as the first coupling port 56, the second coupling port 57, the second fuse terminal insertion port 58, the third fuse terminal insertion port 59, and the output terminal insertion port 63 may be changed as appropriate.

The following describes a technical idea that can be grasped from the above embodiment and variations.

The wiring unit according to claim 10, wherein the first coupling block main body includes a first coupling hole that extends through the power distribution layer and the ground layer of the first coupling block main body, the third conduction member is exposed to the inside of the first coupling hole, and the locking member insertion port is an opening on one side of the first coupling hole.

According to this aspect, it is possible to keep the earth terminal from coming out of the ground layer by using the first coupling hole in which the third conduction member is exposed.

LIST OF REFERENCE NUMERALS

1 Wiring system
10 Electrical device
11 Electrical device
12 Electrical device
13 Electrical device
14 Electrical device
20 Battery
21 First wiring unit
22 Second wiring unit
23 Third wiring unit
24 Fourth wiring unit
30 Power supply block
31 Block main body
32 First conduction member
33 Second conduction member
34 First through hole
35 First insertion port
36 First connection port
37 Second through hole
38 Second connection port
39 Third connection port
41 First fuse terminal insertion port
42 First fuse terminal insertion port
44 First insertion hole
50 Coupling block
50a First coupling block
50b Second coupling block
50c Third coupling block
51 Coupling block main body
52 Third conduction member
53 Power distribution layer
54 Ground layer
55 Third through hole
56 First coupling port
57 Second coupling port
58 Second fuse terminal insertion port
59 Third fuse terminal insertion port
61 Second insertion hole
62 Second insertion hole
63 Output terminal insertion port
64 Third insertion hole
65 Earth terminal insertion port
66 Fourth insertion hole
71 First power supply terminal
72 Second power supply terminal
81 Fuse
82 First fuse terminal
83 Second fuse terminal
91 Output terminal
92 Earth terminal
93 Conductive portion
94 Locking portion
95 Locking member
96 Coupling terminal
101 First wire
102 Second wire
103 Third wire
104 Fourth wire
A1 First installation area
A2 Second installation area
A3 Third installation area
A4 Fourth installation area

What is claimed is:

1. A wiring unit comprising:
a plurality of power supply blocks each comprising:
a block main body that includes a first insertion port for inserting a power supply terminal and a first fuse terminal insertion port for inserting a first fuse terminal of a fuse that includes the first fuse terminal and a second fuse terminal;
a conductive first conduction member that is held inside the block main body and is configured to be electrically connected to the power supply terminal; and
a conductive second conduction member that is held inside the block main body, is electrically connected to the first conduction member inside the block main body, and is configured to be electrically connected to the first fuse terminal; and
at least the same number of first coupling blocks as the fuses, the first coupling blocks each comprising:
a first coupling block main body including a second fuse terminal insertion port for inserting the second fuse terminal of the fuse; and
a conductive third conduction member that is held inside the first coupling block main body,
wherein the second fuse terminal inserted into the second fuse terminal insertion port is electrically connected to the third conduction member,
first fuse terminals of different fuses are respectively inserted into the first fuse terminal insertion ports of different power supply blocks, and
second fuse terminals of different fuses are respectively inserted into the second fuse terminal insertion ports of different first coupling blocks.

2. The wiring unit according to claim 1,
wherein the first coupling block main body includes a first output terminal insertion port for inserting an output terminal, and
the output terminal inserted into the first output terminal insertion port is electrically connected to the third conduction member.

3. The wiring unit according to claim 2, further comprising:
a second coupling block that includes a second coupling block main body and a conductive fourth conduction member that is held inside the second coupling block main body,
wherein the first coupling block main body includes a first coupling port for inserting a coupling terminal, the second coupling block main body includes a second coupling port for inserting the coupling terminal inserted into the first coupling port and a second output terminal insertion port for inserting an output terminal other than the output terminal inserted into the first output terminal insertion port, the coupling terminal inserted into the first coupling port is electrically connected to the third conduction member, and the coupling terminal inserted into the second coupling port and the output terminal inserted into the second output terminal insertion port are electrically connected to the fourth conduction member.

4. The wiring unit according to claim 3, further comprising:

at least one third coupling block that includes a third coupling block main body and a conductive fifth conduction member that is held inside the third coupling block main body, wherein the first coupling block main body includes a first coupling hole that extends through the first coupling block main body, the first coupling port is an opening on one side of the first coupling hole, the third conduction member is exposed to the inside of the first coupling hole, the second coupling block main body includes a second coupling hole that extends through the second coupling block main body, the second coupling port is an opening on one side of the second coupling hole, the fourth conduction member is exposed to the inside of the second coupling hole, the third coupling block main body includes a third coupling hole that extends through the third coupling block main body and a third output terminal insertion port for connecting an output terminal other than the output terminal inserted into the first output terminal insertion port and the output terminal inserted into the second output terminal insertion port, the fifth conduction member is exposed to the inside of the third coupling hole and configured to be electrically connected to the output terminal inserted into the third output terminal insertion port, and the coupling terminal passes through the first coupling hole, the second coupling hole, and the third coupling hole and is electrically connected to the third conduction member inside the first coupling hole, the fourth conduction member inside the second coupling hole, and the fifth conduction member inside the third coupling hole.

5. The wiring unit according to claim 1, wherein the first coupling block main body includes a power distribution layer that is made of an insulative material and holds the third conduction member and a ground layer that is made of a conductive material and is grounded, and the ground layer includes an earth terminal insertion port for inserting an earth terminal, and the earth terminal inserted into the earth terminal insertion port is electrically connected to the ground layer.

6. The wiring unit according to claim 5, wherein the ground layer includes a locking member insertion port for inserting a locking member that passes through the earth terminal inside the ground layer.

7. A wiring system, wherein a wiring unit according to claim 4 is arranged in each of a plurality of installation areas in which at least one electrical device is installed, and the wiring units distribute power supplied from their power supply terminal, via their first fuse terminal to the electrical devices installed in the installation areas in which the wiring units are arranged.

8. The wiring system according to claim 7, comprising:

a wire that electrically connects the power supply terminals included in different wiring units.

9. The wiring unit according to claim 1, wherein the block main body includes a connection hole that extends through the block main body, the first insertion port is an opening on one side of the connection hole, and the first conduction member is exposed to the inside of the connection hole.

* * * * *